US012772029B2

(12) United States Patent
Cheng et al.

(10) Patent No.: US 12,772,029 B2
(45) Date of Patent: Oct. 20, 2026

(54) TECHNIQUES FOR SELECTING AND RESELECTING SIDELINK RELAY

(71) Applicant: QUALCOMM INCORPORATED, San Diego, CA (US)

(72) Inventors: Peng Cheng, Beijing (CN); Hong Cheng, Basking Ridge, NJ (US); Sudhir Kumar Baghel, Pleasanton, CA (US); Gavin Bernard Horn, La Jolla, CA (US); Wanshi Chen, San Diego, CA (US); Karthika Paladugu, San Diego, CA (US); Ozcan Ozturk, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/759,706

(22) PCT Filed: Feb. 29, 2020

(86) PCT No.: PCT/CN2020/077319

§ 371 (c)(1),
(2) Date: Jul. 28, 2022

(87) PCT Pub. No.: WO2021/168848

PCT Pub. Date: Sep. 2, 2021

(65) Prior Publication Data

US 2023/0053351 A1 Feb. 23, 2023

(51) Int. Cl.
*H04W 8/00* (2009.01)
*H04W 24/10* (2009.01)
*H04W 76/14* (2018.01)

(52) U.S. Cl.
CPC .......... *H04W 8/005* (2013.01); *H04W 24/10* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 10,531,365 | B2 | 1/2020 | Kaur et al. | |
| 2015/0208384 | A1 * | 7/2015 | Baghel | H04W 8/005 455/450 |

(Continued)

FOREIGN PATENT DOCUMENTS

| | | | |
|---|---|---|---|
| CN | 106304258 | A | 1/2017 |
| CN | 107113916 | A | 8/2017 |

(Continued)

OTHER PUBLICATIONS

Supplementary European Search Report—EP20921472—Search Authority—The Hague—Jan. 26, 2024.

(Continued)

*Primary Examiner* — Benjamin Lamont
(74) *Attorney, Agent, or Firm* — Holland & Hart LLP/ QUALCOMM Incorporated

(57) ABSTRACT

Methods, systems, and devices for wireless communications are described. A user equipment (UE) may determine to operate as a relay UE based on a set of thresholds configured for the first UE. The UE may transmit a relay discovery announcement on a communication channel of a sidelink to indicate support for relay communications. A remote UE may monitor for and receive the relay discovery announcement on the sidelink communications channel. The remote UE may select the relay UE based on a set of criteria for selecting a candidate relay UE. The remote UE and the relay UE may establish the relay communications based on the relay discovery announcement transmitted on the communications channel of the relay sidelink.

26 Claims, 20 Drawing Sheets

(56) References Cited

U.S. PATENT DOCUMENTS

| | | | | |
|---|---|---|---|---|
| 2016/0044613 | A1* | 2/2016 | Cai | H04W 88/04 370/315 |
| 2016/0135203 | A1* | 5/2016 | Kim | H04W 76/23 370/315 |
| 2016/0198516 | A1* | 7/2016 | Kim | H04W 76/14 370/312 |
| 2016/0204847 | A1 | 7/2016 | Ryu et al. | |
| 2016/0285934 | A1* | 9/2016 | Cheng | H04W 4/06 |
| 2017/0111780 | A1* | 4/2017 | Rico Alvarino | H04W 74/0833 |
| 2017/0317740 | A1* | 11/2017 | Basu Mallick | H04W 8/005 |
| 2018/0092017 | A1* | 3/2018 | Freda | H04W 88/04 |
| 2018/0098370 | A1* | 4/2018 | Bangolae | H04W 88/04 |
| 2018/0115362 | A1* | 4/2018 | Yasukawa | H04B 7/15507 |
| 2018/0152234 | A1 | 5/2018 | Huang et al. | |
| 2018/0213588 | A1* | 7/2018 | Wei | H04W 48/08 |
| 2018/0255499 | A1* | 9/2018 | Loehr | H04W 40/22 |
| 2018/0255505 | A1* | 9/2018 | Thyagarajan | H04J 11/0069 |
| 2019/0349069 | A1* | 11/2019 | Gandikota | H04B 7/15557 |
| 2020/0154290 | A1* | 5/2020 | Lee | H04W 40/22 |
| 2021/0144604 | A1* | 5/2021 | Ramachandra | H04W 24/10 |
| 2022/0337990 | A1* | 10/2022 | Ebrahim Rezagah | H04W 76/14 |

FOREIGN PATENT DOCUMENTS

| | | | |
|---|---|---|---|
| CN | 107534831 | A | 1/2018 |
| CN | 107535014 | A | 1/2018 |
| CN | 108141775 | A | 6/2018 |
| CN | 108809897 | A | 11/2018 |
| EP | 3121974 | A1 | 1/2017 |
| EP | 3148285 | A1 | 3/2017 |
| WO | 2015002456 | A1 | 1/2015 |
| WO | WO-2016165134 | A1 | 10/2016 |
| WO | WO-2017030572 | A1 | 2/2017 |
| WO | WO-2017069866 | A1 | 4/2017 |
| WO | 2018085568 | A1 | 5/2018 |

OTHER PUBLICATIONS

Supplementary Partial European Search Report—EP20921472—Search Authority—The Hague—Oct. 26, 2023.

International Search Report and Written Opinion—PCT/CN2020/077319—ISA/EPO—Nov. 26, 2020.

* cited by examiner

TECHNIQUES FOR SELECTING AND RESELECTING SIDELINK RELAY

CROSS REFERENCE

The present application is a 371 national stage filing of International PCT Application No. PCT/CN2020/077319 by CHENG et al. entitled "TECHNIQUES FOR SELECTING AND RESELECTING SIDELINK RELAY," filed Feb. 29, 2020; which is assigned to the assignee hereof, and which is expressly incorporated by reference in its entirety herein.

FIELD OF TECHNOLOGY

The following relates generally to wireless communications and more specifically to techniques for selecting and reselecting sidelink relay.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE in a wireless communications system may operate as a relay node for a remote UE, conveying traffic so the remote UE can communicate with a base station. A relay UE may provide a relay sidelink for the remote UE, and the relay UE may communicate with the base station using a cellular link. Techniques for selecting and reselecting a relay UE can be improved.

SUMMARY

The described techniques relate to improved methods, systems, devices, and apparatuses that support techniques for selecting and reselecting sidelink relay. Generally, the described techniques provide for communicating relay discovery messages using a communications channel of a sidelink relay. A user equipment (UE) in a wireless communications system may operate as a relay node for a remote UE, conveying traffic so the remote UE can communicate with a base station. A relay UE may provide a relay sidelink for the remote UE, and the relay UE may communicate with the base station using a cellular link. The relay UE may be in coverage of the base station, while a remote UE may be either in coverage or out of coverage. In some cases, the remote UE may select the relay UE. For example, the remote UE may identify the presence of at least one candidate relay UE in proximity of the remote UE. In some cases, the relay UE may announce its presence by transmitting discovery messages. In some examples, the remote UE may transmit a relay request message. Nearby candidate relay UEs may receive the relay request message and transmit relay discovery messages. The remote UE may detect the candidate relay UEs based on the relay discovery messages. A nearby relay may receive the discovery solution message and respond to establish the relay sidelink.

Wireless communications systems described herein support enhanced techniques for sidelink relay selection and reselection. In some cases, these techniques may enable remote UEs to identify and select, or reselect, candidate relay UEs by communicating relay discovery messages over a communication channel of a relay sidelink. For example, relay UEs and remote UEs may transmit and receive discovery messages over a communication channel of a relay sidelink, such as a sidelink shared channel or a sidelink control channel. In some cases, the base station may configure resources on the relay sidelink for a relay UE and a remote UE to send and receive relay discovery announcements and relay discovery requests. Therefore, the wireless communications system may still provide for a relay UE and a remote UE to send discovery signaling without the use of a dedicated discovery channel. Additionally, enhanced technique are described for a UE to determine to operate as a relay UE, and for a remote UE to select a candidate relay UE to establish the relay sidelink.

A method of wireless communications at a first UE is described. The method may include determining to operate as a relay UE based on a set of thresholds configured for the first UE, transmitting a relay discovery announcement on a sidelink channel indicating support for relay communications based on the determination to operate as the relay UE, and establishing the relay communications with a second UE based on the transmission of the relay discovery announcement on the sidelink channel.

An apparatus for wireless communications at a first UE is described. The apparatus may include a processor, memory coupled with the processor, and instructions stored in the memory. The instructions may be executable by the processor to cause the apparatus to determine to operate as a relay UE based on a set of thresholds configured for the first UE, transmit a relay discovery announcement on a sidelink channel indicating support for relay communications based on the determination to operate as the relay UE, and establish the relay communications with a second UE based on the transmission of the relay discovery announcement on the sidelink channel.

Another apparatus for wireless communications at a first UE is described. The apparatus may include means for determining to operate as a relay UE based on a set of thresholds configured for the first UE, transmitting a relay discovery announcement on a sidelink channel indicating support for relay communications based on the determination to operate as the relay UE, and establishing the relay communications with a second UE based on the transmission of the relay discovery announcement on the sidelink channel.

A non-transitory computer-readable medium storing code for wireless communications at a first UE is described. The code may include instructions executable by a processor to determine to operate as a relay UE based on a set of thresholds configured for the first UE, transmit a relay discovery announcement on a sidelink channel indicating support for relay communications based on the determination to operate as the relay UE, and establish the relay communications with a second UE based on the transmission of the relay discovery announcement on the sidelink channel.

Some examples of the method, apparatuses, and non-transitory computer-readable medium described herein may further include operations, features, means, or instructions for receiving, from the second UE on the sidelink channel, a relay request to operate as the relay UE for the second UE, where the determination to operate as the relay UE may be based on receiving the relay request.

Some examples of the method, apparatuses, and non-transitory computer-readable medium described herein may further include operations, features, means, or instructions for indicating, to the second UE, load information for the first UE, battery information for the first UE, a quality of service level supported for the relay communications, or a combination thereof, where the relay request may be received based on the indication.

Some examples of the method, apparatuses, and non-transitory computer-readable medium described herein may further include operations, features, means, or instructions for receiving a radio resource control message from a base station indicating a set of sets of thresholds including the set of thresholds.

In some examples of the method, apparatuses, and non-transitory computer-readable medium described herein, the set of sets of thresholds includes a first set of thresholds used when the first UE may be not connected to a remote UE and a second set of thresholds used when the first UE may be connected to at least one remote UE.

In some examples of the method, apparatuses, and non-transitory computer-readable medium described herein, a difference between a high threshold and a low threshold of the first set of thresholds may be smaller than the difference between the high threshold and the low threshold of the second set of thresholds.

In some examples of the method, apparatuses, and non-transitory computer-readable medium described herein, the determination to operate as the relay UE may be further based on a mobility state of the first UE.

Some examples of the method, apparatuses, and non-transitory computer-readable medium described herein may further include operations, features, means, or instructions for reporting, to a base station, a reference signal measurement, load information for the first UE, battery information for the first UE, or any combination thereof, and receiving, from the base station, an indication to transmit the relay discovery announcement based on the reporting.

In some examples of the method, apparatuses, and non-transitory computer-readable medium described herein, the load information includes a channel busy rate for the sidelink channel for the first UE.

In some examples of the method, apparatuses, and non-transitory computer-readable medium described herein, the reference signal measurement, the load information, the battery information, or any combination thereof, may be transmitted in a measurement report for radio resource management.

Some examples of the method, apparatuses, and non-transitory computer-readable medium described herein may further include operations, features, means, or instructions for indicating, to the second UE, a quality of service level supported by the first UE for relay communications based on the transmission of the relay discovery announcement.

In some examples of the method, apparatuses, and non-transitory computer-readable medium described herein, the quality of service level may be indicated by a medium access control element or by an application code associated with a discovery announcement message.

Some examples of the method, apparatuses, and non-transitory computer-readable medium described herein may further include operations, features, means, or instructions for receiving, from a base station, a set of quality of service levels, where the relay discovery announcement may be transmitted on the sidelink channel based on the set of quality of service levels including the quality service level of the relay communications.

Some examples of the method, apparatuses, and non-transitory computer-readable medium described herein may further include operations, features, means, or instructions for receiving, from a base station, a radio resource control configuration for a set of resources to transmit the relay discovery announcement on the sidelink channel.

Some examples of the method, apparatuses, and non-transitory computer-readable medium described herein may further include operations, features, means, or instructions for receiving, from a base station, downlink control information scheduling the first UE a set of resources to transmit the relay discovery announcement on the sidelink channel.

Some examples of the method, apparatuses, and non-transitory computer-readable medium described herein may further include operations, features, means, or instructions for transmitting, to a base station, a relay discovery announcement request including a quality of service level supported by the first UE for relay communications, and receiving, from the base station, a relay discovery announcement response for the relay discovery announcement request, where the transmission of the relay discovery announcement may be based on receiving the relay discovery announcement response.

Some examples of the method, apparatuses, and non-transitory computer-readable medium described herein may further include operations, features, means, or instructions for including an indicator in a packet data convergence protocol (PDCP) packet of the relay discovery announcement that the relay discovery announcement may be associated with relay discovery.

Some examples of the method, apparatuses, and non-transitory computer-readable medium described herein may further include operations, features, means, or instructions for receiving, from the second UE on the sidelink channel, a measurement report of the sidelink channel based on an L3 filtering of a reference signal measurement.

A method of wireless communications at a second UE is described. The method may include monitoring for a relay discovery announcement on a sidelink channel to establish relay communications with a first UE operating as a relay UE, where the relay communications are associated with a quality of service level, receiving the relay discovery announcement via a broadcast on the sidelink channel from the first UE, where the first UE supports the quality of service level for the relay communications, and establishing the relay communications with the first UE based on receiving the relay discovery announcement.

An apparatus for wireless communications at a second UE is described. The apparatus may include a processor, memory coupled with the processor, and instructions stored in the memory. The instructions may be executable by the processor to cause the apparatus to monitor for a relay discovery announcement on a sidelink channel to establish relay communications with a first UE operating as a relay UE, where the relay communications are associated with a quality of service level, receive the relay discovery announcement via a broadcast on the sidelink channel from the first UE, where the first UE supports the quality of service level for the relay communications, and establish the relay communications with the first UE based on receiving the relay discovery announcement.

Another apparatus for wireless communications at a second UE is described. The apparatus may include means for monitoring for a relay discovery announcement on a sidelink channel to establish relay communications with a first UE operating as a relay UE, where the relay communications are associated with a quality of service level, receiving the relay discovery announcement via a broadcast on the sidelink channel from the first UE, where the first UE supports the quality of service level for the relay communications, and establishing the relay communications with the first UE based on receiving the relay discovery announcement.

A non-transitory computer-readable medium storing code for wireless communications at a second UE is described. The code may include instructions executable by a processor to monitor for a relay discovery announcement on a sidelink channel to establish relay communications with a first UE operating as a relay UE, where the relay communications are associated with a quality of service level, receive the relay discovery announcement via a broadcast on the sidelink channel from the first UE, where the first UE supports the quality of service level for the relay communications, and establish the relay communications with the first UE based on receiving the relay discovery announcement.

Some examples of the method, apparatuses, and non-transitory computer-readable medium described herein may further include operations, features, means, or instructions for determining to establish relay communications with a base station, transmitting a relay discovery announcement request including a quality of service level for the relay communications, receiving a relay discovery announcement response based on transmitting the relay discovery announcement request, and transmitting a relay request on the sidelink channel to the first UE for the first UE to operate as the relay UE based on the relay discovery announcement response, where the relay discovery announcement may be received based on transmitting the relay request.

Some examples of the method, apparatuses, and non-transitory computer-readable medium described herein may further include operations, features, means, or instructions for receiving an indication that the first UE supports the quality of service level for the relay communications.

In some examples of the method, apparatuses, and non-transitory computer-readable medium described herein, the indication may be received via a medium access control element or by an application code associated with a relay discovery message.

Some examples of the method, apparatuses, and non-transitory computer-readable medium described herein may further include operations, features, means, or instructions for selecting the first UE as the relay UE for the relay communications.

Some examples of the method, apparatuses, and non-transitory computer-readable medium described herein may further include operations, features, means, or instructions for receiving an indication that the first UE supports the quality of service level of the relay communications, where the selection may be based on the indication.

Some examples of the method, apparatuses, and non-transitory computer-readable medium described herein may further include operations, features, means, or instructions for receiving an indication of a load of the first UE, where the first UE may be selected based on the load of the first UE being below a load threshold.

Some examples of the method, apparatuses, and non-transitory computer-readable medium described herein may further include operations, features, means, or instructions for receiving a system information block including the load threshold.

Some examples of the method, apparatuses, and non-transitory computer-readable medium described herein may further include operations, features, means, or instructions for receiving an indication of a battery level of the first UE, where the first UE may be selected based on the battery level being above a battery threshold.

Some examples of the method, apparatuses, and non-transitory computer-readable medium described herein may further include operations, features, means, or instructions for receiving a system information block including the battery threshold.

Some examples of the method, apparatuses, and non-transitory computer-readable medium described herein may further include operations, features, means, or instructions for determining the third UE cannot support the quality of service level for the relay communications, where the relay communications may be established with the first UE based on the determination.

In some examples of the method, apparatuses, and non-transitory computer-readable medium described herein, the relay communications may be established with the first UE based on the first UE providing the quality of service level for the relay communications, a load of the first UE satisfying a load threshold, a battery level of the first UE satisfying a battery threshold, or a combination thereof.

Some examples of the method, apparatuses, and non-transitory computer-readable medium described herein may further include operations, features, means, or instructions for identifying an indicator that the relay discovery announcement may be associated with relay discovery in a PDCP packet of the relay discovery announcement.

Some examples of the method, apparatuses, and non-transitory computer-readable medium described herein may further include operations, features, means, or instructions for measuring a reference signal received from the first UE, filtering the reference signal based on an identifier of the first UE, and transmitting a measurement report for the reference signal to the first UE based on the filtering.

A method of wireless communications at a base station is described. The method may include receiving a relay discovery request message including a quality of service level for relay communications between a first UE and a second UE, transmitting a relay discovery response message including an application code for relay discovery based on the quality of service level for the relay communications, configuring the first UE with a set of resources on a sidelink channel for a relay discovery announcement on the sidelink channel, and receiving, from the first UE, data for the second UE based on the relay communications between the first UE and the second UE.

An apparatus for wireless communications at a base station is described. The apparatus may include a processor, memory coupled with the processor, and instructions stored in the memory. The instructions may be executable by the processor to cause the apparatus to receive a relay discovery request message including a quality of service level for relay communications between a first UE and a second UE, transmit a relay discovery response message including an application code for relay discovery based on the quality of service level for the relay communications, configure the first UE with a set of resources on a sidelink channel for a relay discovery announcement on the sidelink channel, and receive, from the first UE, data for the second UE based on the relay communications between the first UE and the second UE.

Another apparatus for wireless communications at a base station is described. The apparatus may include means for receiving a relay discovery request message including a quality of service level for relay communications between a first UE and a second UE, transmitting a relay discovery response message including an application code for relay discovery based on the quality of service level for the relay communications, configuring the first UE with a set of resources on a sidelink channel for a relay discovery announcement on the sidelink channel, and receiving, from the first UE, data for the second UE based on the relay communications between the first UE and the second UE.

A non-transitory computer-readable medium storing code for wireless communications at a base station is described. The code may include instructions executable by a processor to receive a relay discovery request message including a quality of service level for relay communications between a first UE and a second UE, transmit a relay discovery response message including an application code for relay discovery based on the quality of service level for the relay communications, configure the first UE with a set of resources on a sidelink channel for a relay discovery announcement on the sidelink channel, and receive, from the first UE, data for the second UE based on the relay communications between the first UE and the second UE.

Some examples of the method, apparatuses, and non-transitory computer-readable medium described herein may further include operations, features, means, or instructions for transmitting, to the first UE, a radio resource control message indicating a set of sets of thresholds.

In some examples of the method, apparatuses, and non-transitory computer-readable medium described herein, the set of sets of thresholds includes a first set of thresholds used when the first UE may be not connected to a remote UE and a second set of thresholds used when the first UE may be connected to at least one remote UE.

In some examples of the method, apparatuses, and non-transitory computer-readable medium described herein, a difference between a high threshold and a low threshold of the first set of thresholds may be smaller than the difference between a high threshold and a low threshold of the second set of thresholds.

Some examples of the method, apparatuses, and non-transitory computer-readable medium described herein may further include operations, features, means, or instructions for receiving, from the first UE, a reference signal measurement, load information for the first UE, battery information for the first UE, or any combination thereof, and transmitting an indication for the first UE to broadcast the relay discovery announcement based on the reporting.

In some examples of the method, apparatuses, and non-transitory computer-readable medium described herein, the load information includes a channel busy rate for the sidelink channel for the first UE.

In some examples of the method, apparatuses, and non-transitory computer-readable medium described herein, the reference signal measurement, the load information, or the battery information, or any combination thereof, may be received in a measurement report for radio resource management.

Some examples of the method, apparatuses, and non-transitory computer-readable medium described herein may further include operations, features, means, or instructions for configuring the first UE with a set of quality of service levels, where the first UE may be configured to perform discovery for the relay communications based on the set of quality of service levels including the quality service level of the relay communications.

Some examples of the method, apparatuses, and non-transitory computer-readable medium described herein may further include operations, features, means, or instructions for indicating the quality of service level for the relay communications based on the application code for the relay discovery.

In some examples of the method, apparatuses, and non-transitory computer-readable medium described herein, configuring the first UE with the set of resources on the sidelink channel further may include operations, features, means, or instructions for transmitting an indication via downlink control information that the set of resources may be configured for discovery signaling.

In some examples of the method, apparatuses, and non-transitory computer-readable medium described herein, configuring the first UE with the set of resources on the sidelink channel further may include operations, features, means, or instructions for transmitting an indication via radio resource control signaling that the set of resources may be configured for discovery signaling.

In some examples of the method, apparatuses, and non-transitory computer-readable medium described herein, the relay discovery request message may be received from the first UE, and the relay discovery response message may be transmitted to the first UE.

In some examples of the method, apparatuses, and non-transitory computer-readable medium described herein, the relay discovery request message may be received from the second UE, and the relay discovery response message may be transmitted to the second UE.

DETAILED DESCRIPTION

Figure 1:
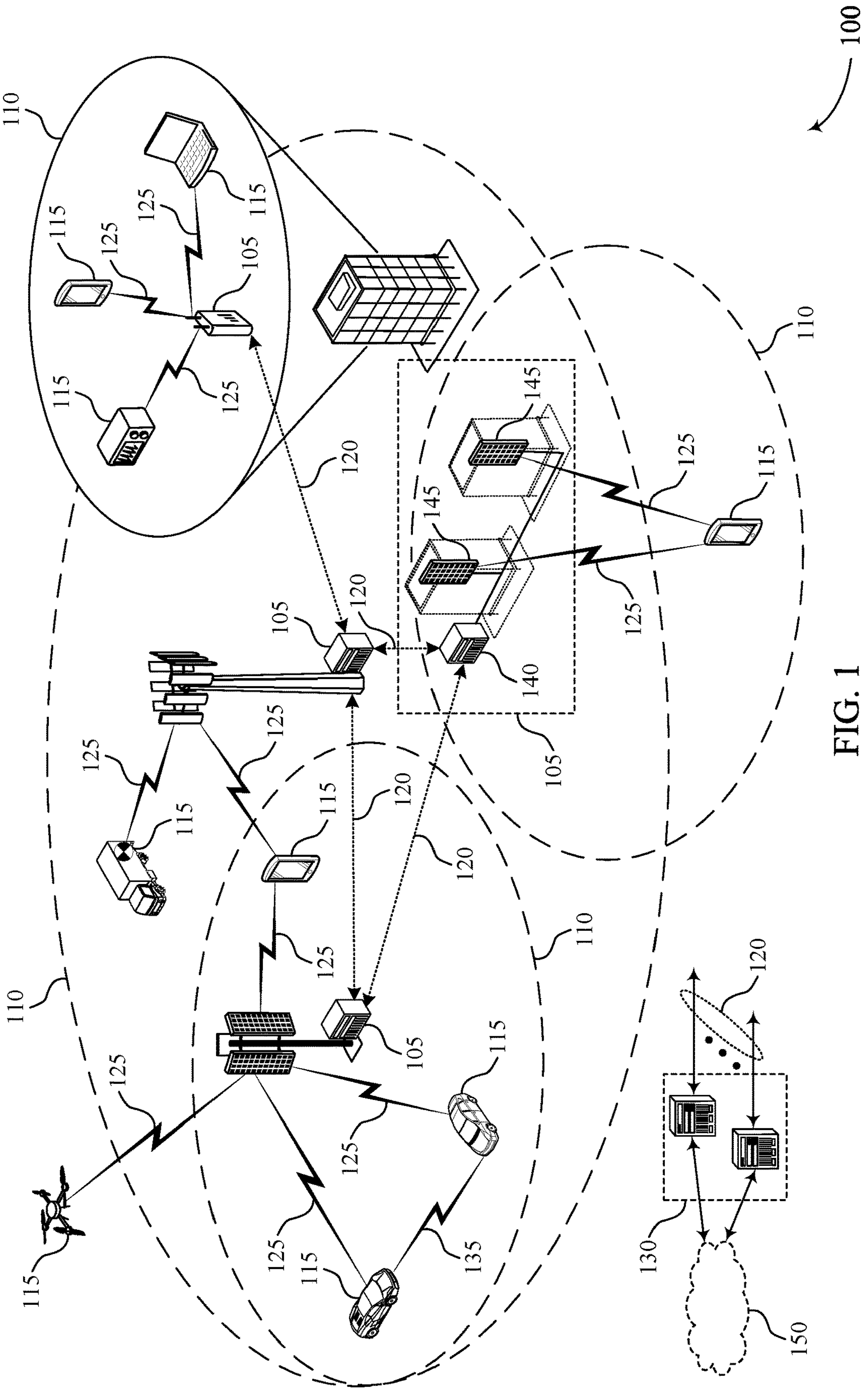
FIG. 1 illustrates an example of a system for wireless communications that supports techniques for selecting and reselecting sidelink relay in accordance with aspects of the present disclosure.

A user equipment (UE) in a wireless communications system may operate as a relay node for a remote UE, conveying traffic so the remote UE can communicate with a base station. A relay UE may provide a relay sidelink for the remote UE, and the relay UE may communicate with the base station using a cellular link. The relay UE may be in coverage of the base station, while a remote UE may be either in coverage or out of coverage. In some cases, the remote UE may select the relay UE. For example, the remote UE may identify the presence of at least one candidate relay UE in proximity of the remote UE. In some cases, the relay UE may announce its presence by transmitting discovery messages. In some examples, the remote UE may transmit a relay request message. Nearby candidate relay UEs may receive the relay request message and transmit relay discovery messages. The remote UE may detect the candidate relay UEs based on the relay discovery messages. A nearby relay may receive the discovery solution message and respond to establish the relay sidelink. Some wireless communications systems provide a separate discovery channel for communication discovery messages. Remote UEs may monitor the dedicated discovery channel to identify candidate relay UEs. However, these dedicated channels may lead to significant system overhead, which may be reduced by removing the dedicated channels. Therefore, some systems may not provide a separate discovery channel. While removing the dedicated discovery channel may reduce system overhead and increase radio frequency spectral efficiency, it may also remove the common channel used for remote UEs to identify candidate relay UEs.

Therefore, wireless communications systems described herein support enhanced techniques for sidelink relay selection and reselection. In some cases, these techniques may enable remote UEs to identify and select, or reselect, candidate relay UEs without the use of a dedicated discovery channel. For example, the wireless communications systems may support relay UEs and remote UEs transmitting and receiving discovery messages over a communication channel of a relay sidelink, such as a sidelink shared channel or a sidelink control channel. In some cases, the base station may configure resources on the relay sidelink for a relay UE and a remote UE to send and receive relay discovery announcements and relay discovery requests. Therefore, the wireless communications system may still provide for a relay UE and a remote UE to send discovery signaling without the use of a dedicated discovery channel. Additionally, enhanced technique are described for a UE to determine to operate as a relay UE, and for a remote UE to select a candidate relay UE to establish the relay sidelink.

Aspects of the disclosure are initially described in the context of wireless communications systems. Aspects of the disclosure are further illustrated by and described with reference to apparatus diagrams, system diagrams, and flowcharts that relate to techniques for selecting and reselecting sidelink relay.

FIG. 1 illustrates an example of a wireless communications system 100 that supports techniques for selecting and reselecting sidelink relay in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may operate as a relay UE 115 and provide a relay sidelink for remote UEs 115. The remote UEs 115 may send data on the relay sidelinks to the relay UE 115, and the relay UE 115 may send the data of the remote UEs 115 to a base station 105 on a cellular link. The relay UE 115 may be in-coverage of the base station 105, and a remote UE 115 may be either in-coverage or out-of-coverage. A remote UE 115 may identify the presence of at least one relay UE 115 in proximity of the remote UE 115 to request a relay service. In some cases, the relay UE 115 may announce its presence by transmitting discovery messages. For example, the relay UE 115 may periodically transmit discovery messages. The remote UE 115 may receive the relay announcement and establish communications with the relay UE 115. In some examples, the remote UE 115 may announce a discovery solicitation message. A nearby candidate relay UE 115 may receive the discovery solution message and respond to establish the relay sidelink.

A UE 115 may first meet a set of criteria to become a relay UE 115. For example, the relay UE 115 may be authorized by the network for relay services. In some cases, the relay UE 115 may indicate to an MME of a capability to support relay communications. The relay UE 115 may inform upper layers that the relay UE 115 is configured with radio resources that can be used for relay related sidelink communication transmission. In some cases, reference signal received power (RSRP) measurements of a primary cell made by the relay UE may satisfy a pair of configured RSRP thresholds. For example, the RSRP of the primary cell may be above a low RSRP threshold and below a high RSRP threshold for a UE 115 to operate as a relay UE 115. In some cases, the high RSRP threshold may be configured to bound an interference level caused by sidelink transmissions.

The base station 105 may provide transmission and reception resources, a minimum and maximum threshold on cellular link quality that the D2D relay UE observes, a maximum threshold on cellular link quality that the remote UE observes before transmitting relay discovery solicitation request messages, and a threshold on D2D link quality for the remote UE 115 to trigger relay reselection.

Once the remote UE 115 detects the relay UE candidates, the remote UE 115 may select from the candidates based on sidelink radio quality and provided connectivity services. For example, the remote UE 115 may select a relay UE from the relay UE candidates based on whether the RSRP measurement of the relay UE candidate is above a configured RSRP threshold. The remote UE 115 may also select the relay UE 115 based on which candidates can provide a connectivity service of the remote UE 115.

Some wireless communications systems provide a separate discovery channel for communication discovery messages. For example, when a UE 115 determines to operate as a relay UE 115 in these systems, the relay UE 115 may send relay announcements on a dedicated, periodic discovery channel. Remote UEs 115 may monitor the dedicated, periodic discovery channel to identify candidate relay UEs 115. However, some wireless communications systems, such as the wireless communications system 100, may not provide a separate discovery channel. While removing the dedicated discovery channel may reduce system overhead and increase radio frequency spectral efficiency, it may also remove the common channel used for remote UEs 115 to identify relay UEs 115. Therefore, the wireless communications system 100 may support enhanced techniques for sidelink relay selection and reselection. In some cases, these techniques may enable remote UEs 115 to identify and select, or reselect, candidate relay UEs 115 without the use of a dedicated discovery channel.

The wireless communications system 115 may support sending discovery messages over a communication channel of a relay sidelink. For example, the relay UE 115 may send relay discover announcements over a communication channel of the relay sidelink, such as a physical sidelink shared channel (PSSCH) or a physical sidelink control channel (PSCCH). For example, a relay discovery announcement may be transmitted (e.g., broadcasted) using a PC5 interface on the relay sidelink. In some cases, the base station 105 may configure resources on the relay sidelink for the relay UE 115 and remote UEs 115 to send and receive relay discovery announcements and relay discovery requests. Therefore, the wireless communications system 100 may still provide for a relay UE 115 and remote UEs 115 to send discovery signaling without the use of a dedicated discovery channel.

Figure 2:
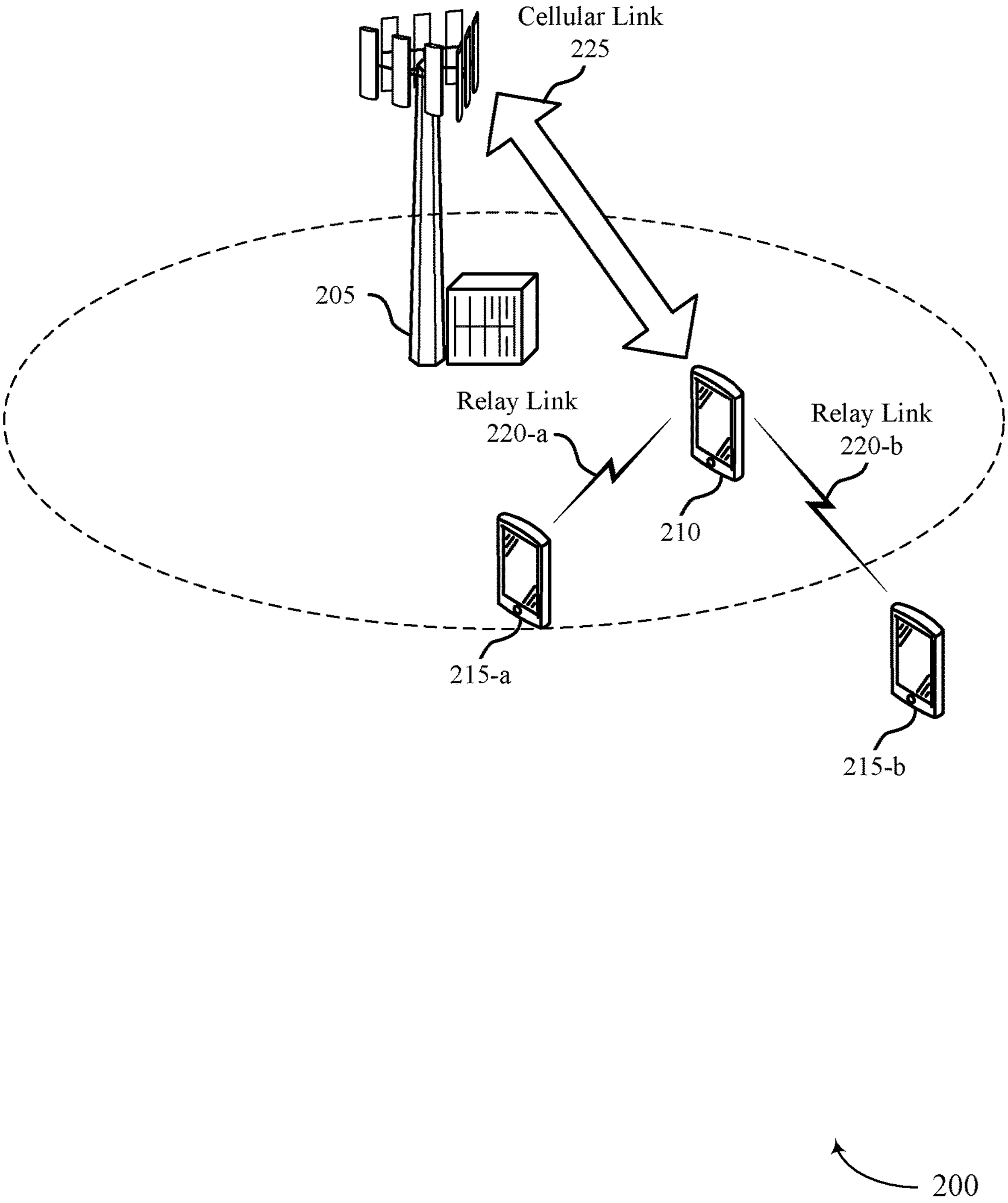
FIG. 2 illustrates an example of a wireless communications system that supports techniques for selecting and reselecting sidelink relay in accordance with aspects of the present disclosure.

FIG. 2 illustrates an example of a wireless communications system 200 that supports techniques for selecting and reselecting sidelink relay in accordance with aspects of the present disclosure. In some examples, the wireless communications system 200 may implement aspects of wireless communication system 100. The wireless communications system 200 includes a relay UE 210, remote UE 215-*a*, and remote UE 215-*b*, which may be each be an example of a UE 115 described with reference to FIG. 1. The wireless communications system 200 may include base station 205, which may be an example of a base station 105 described with reference to FIG. 1. The base station 205 may include aspects of, or be connected to, a proximity services (ProSe) function.

A relay UE 210 may provide a relay sidelink 220 for remote UEs 215. The remote UEs 215 may send data on the relay sidelinks 220 to the relay UE 210, and the relay UE 210 may send the data of the remote UEs 215 to the base station 205 on a cellular link 225. For example, remote UE 215-*a* may send data to and receive data from relay UE 210 on relay sidelink 220-*a*, and remote UE 215-*b* may send data to and receive data from relay UE 210 on relay sidelink 220-*b*.

The relay UE 210 may be in coverage of the base station 205. A remote UE may be either in coverage, like remote UE 215-*b*, or out of coverage, like remote UE 215-*c*. In some cases, relay communications may be provided for a remote UE 215 within the coverage area to provide service continuity (e.g., during a mobility event or handover or to enhance a weak connection).

In some cases, the wireless communications system 200 may support techniques for single-hop relay communications, where a remote UE 215 is connected to the base station 205 via one hop to an additional UE 115 (e.g., the relay UE 115). In some cases, the wireless communications system 200 may support techniques for multi-hop relay communications as well, where a remote UE 215 is connected to the base station 205 via multiple relay UEs.

A remote UE 215 may identify the presence of at least one relay UE 210 in proximity of the remote UE 215 to request a relay service. During relay discovery, the remote UE 215 may obtain the UE identifier of the relay UE 210 to be used for sidelink transmission and reception of relayed traffic. In some cases, the relay UE 210 may announce its presence by transmitting discovery messages. For example, the relay UE 210 may periodically transmit discovery messages for a relay-initiated discovery, or a model A discovery procedure. The remote UE 215 may receive the relay announcement and establish communications with the relay UE 210. In some examples, the remote UE may announce a discovery solicitation message. A nearby relay may receive the discovery solution message and respond to establish the relay sidelink. This may be an example of remote-initiated discovery, or a model B discovery procedure.

Some wireless communications systems provide a separate discovery channel for communication discovery messages. For example, when a UE 115 determines to operate as a relay UE 210 in these systems, the relay UE 115 may send relay announcements on a dedicated, periodic discovery channel. Remote UEs 215 may monitor the dedicated, periodic discovery channel to identify candidate relay UEs. However, some wireless communications systems, such as the wireless communications system 200, may not provide a separate discovery channel. While removing the dedicated discovery channel may reduce system overhead and increase radio frequency spectral efficiency, it may also remove the common channel used for remote UEs 215 to identify relay UEs 210. Therefore, the wireless communications system 200 may support enhanced techniques for sidelink relay selection and reselection. In some cases, these techniques may enable remote UEs 215 to identify and select, or reselect, candidate relay UEs 115 without the use of a dedicated discovery channel.

The wireless communications system 200 may support sending discovery messages over a communication channel of a relay sidelink 220. For example, the relay UE 210 may send relay discover announcements over a communication channel of the relay sidelink 220, such as a sidelink shared channel. For example, a relay discovery announcement may be transmitted (e.g., broadcasted) using a PC5 interface on the relay sidelink 220. In some cases, the base station 205 may configure resources on the relay sidelink 220 for the relay UE 210 and remote UEs 215 to send and receive relay discovery announcements and relay discovery requests. Therefore, the wireless communications system 200 may still provide for a relay UE 210 and remote UEs 215 to send discovery signaling without the use of a dedicated discovery channel.

The wireless communications system 200 also supports enhanced conditions for a UE 115 to determine to operate as the relay UE 210. For example, the relay UE 210 may determine to operate as a relay and send the relay announcement based on checking conditions at the relay UE 210. In some examples, this may be referred to as UE autonomous relay operation, which may not be configured by the network. If the relay UE 210 is in an RRC connected mode and configured with a transmit resource pool for transmitting relay announcements.

A relay UE 210 described herein may determine to operate as the relay based on multiple sets of thresholds. For example, the relay UE 210 may be configured with two sets of RSRP thresholds. A first set of thresholds may be used when the relay UE 210 is not connected to a remote UE 215, and a second set of thresholds may be used when the relay UE 210 is connected to at least one remote UE 215. Each set of RSRP thresholds may include a high RSRP threshold and a low RSRP threshold, and the relay UE 210 may determine to operate as a relay if the RSRP of the primary cell is between the high RSRP threshold and the low RSRP threshold. The thresholds in the second set of thresholds may be slightly relaxed compared to the first set of thresholds to increase the possibility of the relay node's service continuity. For example, there may be a larger span of acceptable RSRP measurements when the relay UE 210 is connected to a remote UE 215 such that the relay UE 210 is less likely to drop the relay service of the connected remote UE.

In some cases, the network may configure the relay UE 210 to start transmitting relay information. For example, the relay UE 210 may report a radio resource management (RRM) measurement of the cellular link 225 to base station 205 The RRM measurement may include, for example, an RSRP measurement of a primary cell provided by the base station 205. In some cases, the relay UE 210 may report a QoS that the relay UE 210 can support for relay sidelink communications. In some examples, the relay UE 210 may indicate load information. In some cases, the load information may be based on a load of sidelink communications provided by the relay UE 210. The load information may include a channel busy rate. The load information may be reported together with the RRM measurement in a measurement report. In some examples, the relay UE 210 may report battery information or power information. For example, the relay UE 210 may indicate its current batter level, power consumption information, or both. In some cases, the battery and power information may be report together with the RRM measurement in the measurement report. The base station 205 may receive the reported UE operation conditions and determine whether the relay UE 210 should provide relay services for remote UEs 215. If the relay UE 210 is suitable for providing the relay, the base station 205 may indicate for the relay UE 210 to transmit relay information, such as the discovery announcement, on relay sidelinks 220.

In some examples, base station 205 may configure the relay UE 210 to operate as a relay for a set of QoS. For example, as part of relay configuration, base station 205 may restrict for which QoS the relay UE 210 can become the relay and perform discovery. The relay UE 210 may indicate its supported QoS for remote UEs 215. In some cases, the relay UE 210 may indicate the supported QoS by an application code of a discovery message. For example, the application code may incorporate the supported indicated (e.g., maximum) QoS level of the relay UE 210. In some cases, the relay UE 210 may be indicated the supported QoS by a MAC CE.

The wireless communications system 200 may support enhanced techniques for a remote UE 215 to select, or reselect, a suitable relay. A remote UE 215 may detect suitable relay UE candidates based on a set of criteria. For example, a suitable relay UE may be configured with a resource pool by the network or be preconfigured with a resource pool. In some cases, suitable relay UE may provide a sidelink with good radio quality. For example, an RSRP measurement of the relay sidelink may be greater than a configured RSRP threshold. In some cases, a suitable relay UE may provide a QoS level for the relay sidelink 220 that can satisfy the QoS requirements of traffic of the remote UE 215. In some cases, a suitable relay UE may have a load below a load threshold. In some cases, a suitable relay UE may have a battery (e.g., and power) above a battery threshold. In some cases, the base station 205 may broadcast load and battery thresholds in a system information block, or the remote UEs 215 may be preconfigured with the load and battery thresholds.

The remote UE 215 may identify suitable relay UE candidates that satisfy the described criteria. In some cases, a candidate relay UE may be suitable based on satisfying one or more of the above criteria, or the candidate relay UE may be suitable based on satisfying all of the criteria. In some cases, the remote UE 215 may select the suitable candidate relay UE with the highest sidelink radio link quality. Additionally, or alternatively, the remote UE 215 may consider other criteria for selecting the relay UE 210.

The wireless communications system 200 may support enhanced techniques for a remote UE 215 to reselect a relay UE 210. Relay selection may be triggered when a signal strength of a current relay is below a configured signal strength threshold. The remote UE 215 may receive a Layer 2 (L2) link release message (e.g., an upper layer message) from the relay UE 210. In some cases, the relay link may be dropped based on the relay not being able to support a QoS requirement of the traffic. The remote UE 215 may then reselect a suitable based on the RSRP of candidate relay UEs, candidate relay UEs satisfying the QoS requirement, candidate relay UEs having a load below a load threshold, and candidate relay UEs having a battery and power above a battery threshold. The remote UE 215 may reselect to the suitable relay node with the highest sidelink radio quality.

The remote UE 215 may measure RSRP of the relay sidelink 220 from a relay UE 210, which may be used by the remote UE 215 for relay selection or reselection. In some cases, the remote UE 215 may measure a sidelink discovery RSRP. In some cases, the remote UE 215 may apply Layer 3 filtering for the concerned ProSe Relay UE identifier. A filter coefficient may be indicated via a SIB (e.g., SIB19) or be preconfigured. In some cases, a sidelink RSRP may be used as a Layer 1 (L1) measurement, and the sidelink RSRP may be filtered based on an L3 filter coefficient.

The wireless communications system 200 may support enhanced techniques for configuring a resource pool allocation for sending discovery signals on a relay sidelink 220. Based on sending discovery signaling on sidelink communication channels, such as PSSCH and PSCCH, a separate transmission resource pool may be configured from a common communication channel. In some cases, the transmission resource pool for sidelink discovery may be periodic. In some cases, the resource pool may be configured via RRC. For example, an RRC configuration of a resource pool may include a one bit indication that the resource pool is used for sidelink discovery. In some cases, there may be a separate resource pool configuration for discovery. For example, there may be a different type of RRC configuration for a resource pool that is used to convey discovery messages. In some cases, there may be a 1-bit indication in downlink control information that the resources are for relay discover instead of normal sidelink operation. For example, the base station 205 may transmit downlink control information to schedule sidelink resources for the relay UE 210. The downlink control information may include an indicator that the scheduled resources are to be used for discovery instead of normal sidelink operation.

Figure 3:
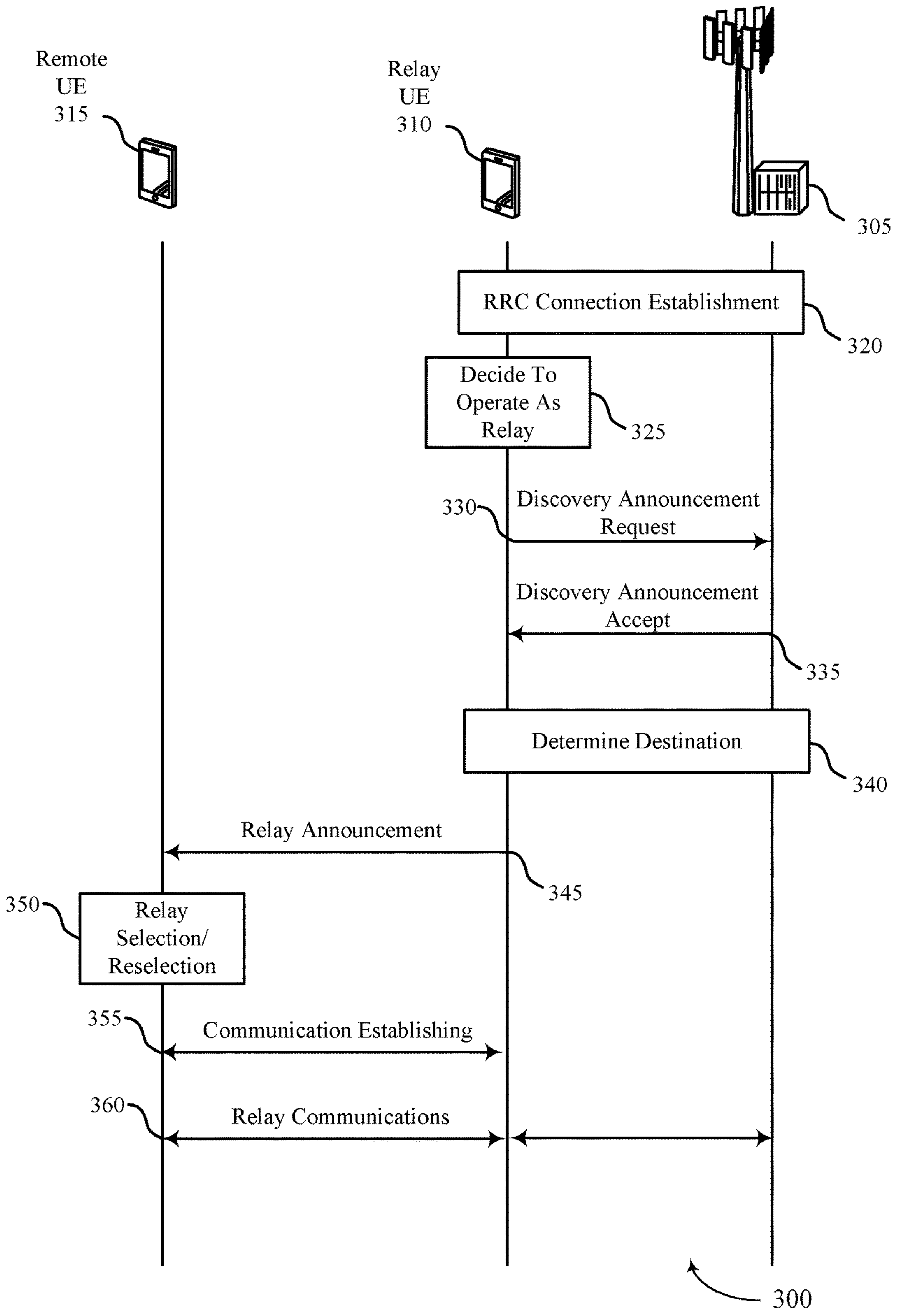
FIG. 3 illustrates an example of a process flow that supports techniques for selecting and reselecting sidelink relay in accordance with aspects of the present disclosure.

FIG. 3 illustrates an example of a process flow 300 that supports techniques for selecting and reselecting sidelink relay in accordance with aspects of the present disclosure. In some examples, process flow 300 may implement aspects of wireless communication system 100. The process flow 300 may include a base station 305, a UE 310, and a UE 315. The base station 305 may be an example of a base station 105 or 205 as described with reference to FIGS. 1 and 2. In some cases, the base station 305 may be connected to a ProSe function, for example via a core network. The UE 310 and the UE 315 may each be an example of a UE 115 as described with reference to FIGS. 1 and 2. In some cases, the UE 310 may provide a relay sidelink for the UE 315, or the UE 310 may be a relay candidate to provide the relay sidelink for the UE 315.

The UE 310 may attach to a wireless communications network including the base station 305. The UE 310 may be authorized and provisioned for UE-to-Network relay operations. In some cases, an MME of the core network may assist in attaching the UE 310 and authorizing the UE 310 to be a relay UE. At 320, the UE 310 and the base station 305 may establish an RRC connection. The UE 310 may send sidelink UE information to the base station 305. In some cases, the UE 310 may receive an RRC reconfiguration message from the base station 305, and the UE 310 may send an RRC reconfiguration complete message in response. In some cases, the UE 310 may be configured with parameters for relay communications via the RRC messages or during the RRC connection establishment.

At 325, the UE 310 may determine to operate as a relay UE based on a set of thresholds configured for the UE 310. For example, the UE 310 may receive an RRC message (e.g., at 320) from the base station 305 indicating multiple sets of thresholds including at least the set of thresholds. In some cases, the multiple sets of thresholds may include two sets of thresholds. A first set of thresholds may be used when the UE 310 does not have any attached remote UEs, and the second set of thresholds may be used when the UE 310 has at least one attached remote UE.

At 330, UE 310 may transmit, to a ProSe function, a discovery announcement request including a quality of service level supported by the UE 310 for relay communications. In some cases, the discovery announcement request may include an application ID, indicating that the request is for the UE 310 to act as a relay. In some cases, the discovery announcement request may be sent to the ProSe function via the base station 305. At 335, the UE 310 may receive a relay discovery announcement response for the relay discover announcement request. The relay discovery announcement response may include an application code based on the request for the UE 310 to act as the relay. At 340, the UE 310 and the base station 305 may determine a destination L2 ID and an application code for reception.

In some cases, the UE 310 may be configured with a set of resources for transmitting a relay discovery announcement. For example, the UE 310 may be configured with a periodic set of resources on a sidelink communication channel which are configured for relay discovery. In some cases, the resource pool used for discovery may be configured via RRC. In some cases, an RRC configured discovery resource pool may be used for dynamic as well as type 1 and type 2 configured grant communications. In some cases, downlink control information may schedule sidelink resources, and an indicator in the downlink control information may indicate that the scheduled sidelink resources are for communicating discovery messages.

At 345, the UE 310 may transmit the relay discovery announcement on a sidelink channel indicating support for relay communications based at least in part on the determination to operate as the relay UE. The relay discovery announcement may be transmitted on a sidelink communication channel, such as PSSCH or PSCCH. In some cases, the relay announcement may be transmitted via a PC5 interface broadcast. In some cases, an indication may be included at the packet data convergence protocol (PDCP) layer indicating that the message is for relay discovery. The UE 315 may distinguish whether a received message is a discovery message based on the indication in the PDCP. In some cases, the relay discover announcement may include an indicator of a QoS level supported by the UE 310, a load of the UE 310, a battery level of the UE 310, or a combination thereof.

The UE 315 may monitor for the relay discovery announcement on the sidelink channel to establish relay communications with a relay UE. The UE 315 may receive the relay discovery announcement via a broadcast on the sidelink channel. In some cases, the relay discovery announcement may indicate that the UE 310 supports at least a QoS level of traffic of the UE 315. In some cases, the UE 315 may identify candidate relay UEs based on broadcasted relay discovery announcements. The UE 315 may identify suitable candidate UEs based on the suitable candidate UEs being configured with a resource pool, the sidelink radio quality toward the candidate being above a threshold, the supported QoS satisfying QoS requirements of the sidelink traffic, a load of the candidate UE being below a load threshold, a battery of the candidate UE being above a battery threshold, or any combination thereof.

The UE 315 may determine that the UE 310 satisfies the criteria to be a suitable relay UE candidate. The UE 315 may determine that the UE 310 has the highest sidelink radio quality of candidate relay UEs, and UE 315 may select the UE 310 to act as the relay UE at 350. In some cases, the UE 315 may measure a sidelink discovery RSRP of the sidelink to UE 310. The UE 315 may apply an L3 filtering for UE 310 to determine the RSRP measurement for UE 310.

At 355, UE 315 and UE 310 may establish relay sidelink communications. For example, the UE 315 may send a direction communication request to the UE 310, and the UE 310 may send a direct security mode command in response. The UE 315 may send a direct security mode complete to the UE 310 and receive a direct communication accept in response to establish the direct (e.g., D2D) relay sidelink communications between the UE 310 and the UE 315. At 360, the UE 315 may communicate with base station 305 via UE 310 as the relay UE.

Figure 4:
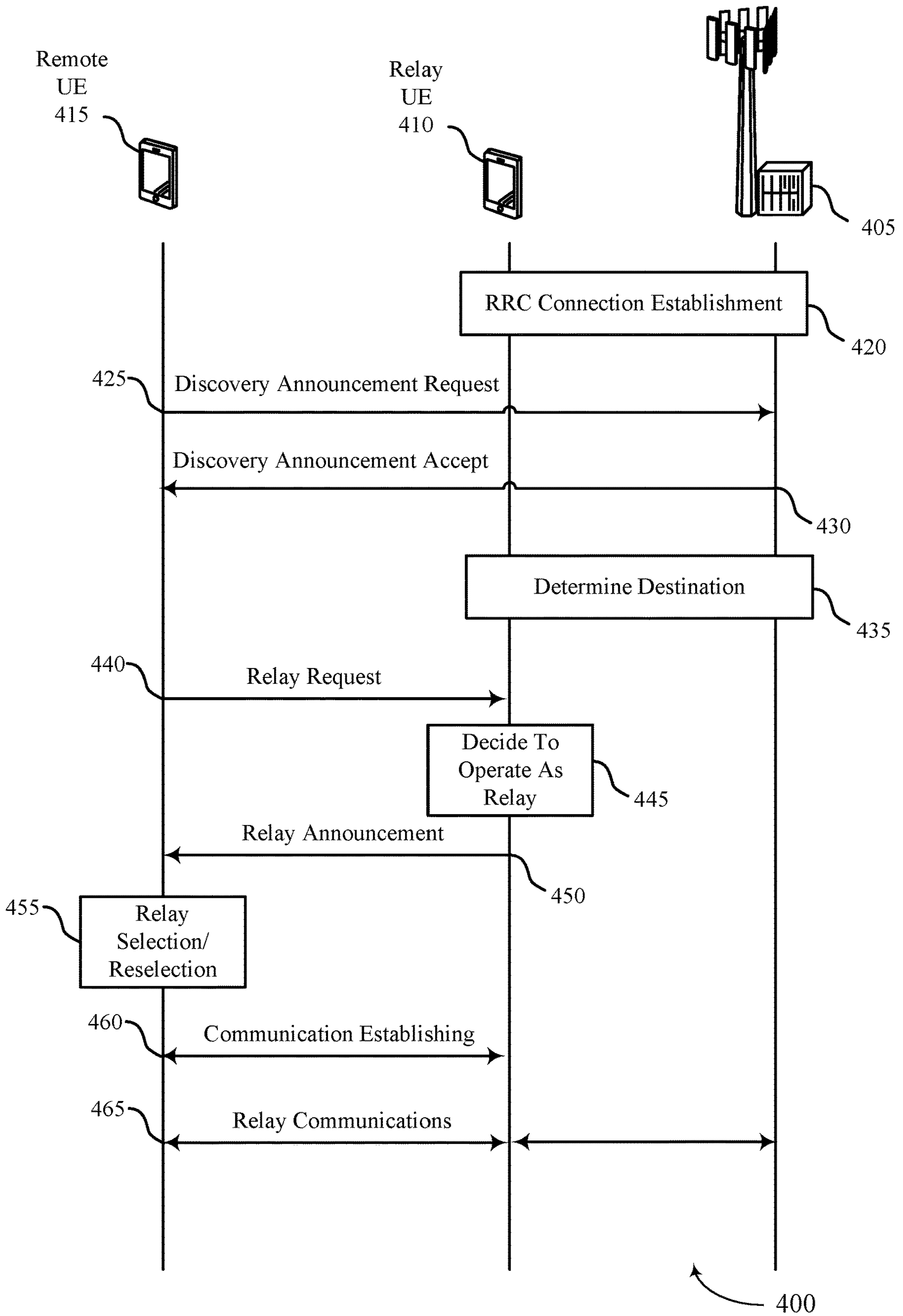
FIG. 4 illustrates an example of a process flow that supports techniques for selecting and reselecting sidelink relay in accordance with aspects of the present disclosure.

FIG. 4 illustrates an example of a process flow 400 that supports techniques for selecting and reselecting sidelink relay in accordance with aspects of the present disclosure. In some examples, process flow 400 may implement aspects of wireless communication system 100. The process flow 400 may include a base station 405, a UE 410, and a UE 415. The base station 405 may be an example of a base station 105 or 205 as described with reference to FIGS. 1 and 2. In some cases, the base station 405 may be connected to a ProSe function, for example via a core network. The UE 410 and the UE 415 may each be an example of a UE 115 as described with reference to FIGS. 1 and 2. In some cases, the UE 410 may provide a relay sidelink for the UE 415, or the UE 410 may be a relay candidate to provide the relay sidelink for the UE 415.

The UE 410 may attach to a wireless communications network including the base station 405. The UE 410 may be authorized and provisioned for UE-to-Network relay operations. In some cases, an MME of the core network may assist in attaching the UE 410 and authorizing the UE 410. At 420, the UE 410 and the base station 405 may establish an RRC connection. The UE 410 may send sidelink UE information to the base station 405. In some cases, the UE 410 may receive an RRC reconfiguration message from the base station 405, and the UE 410 may send an RRC reconfiguration complete message in response. In some cases, the UE 410 may be configured with parameters for relay communications via the RRC messages or during the RRC connection establishment.

The UE 415 may determine to establish a relay connection to the base station 405 via a relay UE. At 425, UE 415 may transmit, to a ProSe function, a discovery announcement request including a quality of service level required by the UE 415 for relay communications. In some cases, the discovery announcement request may include an application ID, indicating that the request is for the UE 415 to be connected with a relay UE. In some cases, the discovery announcement request may be sent to the ProSe function via the base station 405. At 430, the UE 415 may receive a relay discovery announcement response for the relay discover announcement request. The relay discovery announcement response may include an application code based on the request for the UE 415 to be connected with a relay UE. At 435, the base station 405 may identify sidelink configurations for UEs within the proximity of UE 415 (e.g., including UE 410) and determine a destination L2 ID and an application code for reception.

At 440, UE 415 may transmit a relay request on a sidelink channel. In some cases, the relay request may be broadcast via a PC5 interface. In some cases, the relay request may be transmitted on a sidelink communication channel, such as PSSCH or PSCCH. In some cases, an indication may be included at the PDCP layer indicating that the message is for relay discovery. The UE 410 may distinguish whether a received message is a discovery message based on the indication in the PDCP.

In some cases, the UE 415 may be configured with a set of resources for transmitting a relay request. For example, the UE 415 may be configured with a periodic set of resources on a sidelink communication channel which are configured for relay discovery. In some cases, the resource pool used for discovery may be configured via RRC or indicated via a SIB. In some examples, the UE 415 may be preconfigured with a set of resources for transmitting the relay request on the communication sidelink channel. In some cases, an RRC configured discovery resource pool may be used for dynamic as well as type 1 and type 2 configured grant communications. In some cases, downlink control information may schedule sidelink resources, and an indicator in the downlink control information may indicate that the scheduled sidelink resources are for communicating discovery messages.

At 445, the UE 410 may determine to operate as a relay UE based on receiving the relay request and a set of thresholds configured for the UE 410. For example, the UE 410 may receive an RRC message (e.g., at 420) from the base station 405 indicating multiple sets of thresholds. In some cases, the relay request may indicate a requested QoS level, and the UE 410 may determine to operate as the relay UE based on being able to support the requested QoS level.

At 450, the UE 410 may transmit the relay discovery announcement on the sidelink channel indicating support for relay communications based on the determination to operate as the relay UE. In some cases, the relay discovery announcement may be transmitted based on receiving the relay request. The relay discovery announcement may be transmitted on a sidelink communication channel, such as PSSCH or PSCCH. In some cases, the relay announcement may be transmitted via a PC5 interface broadcast. In some cases, an indication may be included at the PDCP layer indicating that the message is for relay discovery. The UE 415 may distinguish whether a received message is a discovery message based on the indication in the PDCP. In some cases, the UE 410 may be configured with a set of resources for transmitting a relay discovery announcement.

The UE 415 may monitor for the relay discovery announcement on the sidelink channel to establish relay communications with a relay UE. The UE 415 may receive the relay discovery announcement via a broadcast on the sidelink channel. In some cases, the relay discovery announcement may indicate that the UE 410 supports at least a QoS level of traffic of the UE 415. In some cases, the UE 415 may identify candidate relay UEs based on broadcasted relay discovery announcements. The UE 415 may identify suitable candidate UEs based on the suitable candidate UEs being configured with a resource pool, the sidelink radio quality toward the candidate being above a threshold, the supported QoS satisfying QoS requirements of the sidelink traffic, a load of the candidate UE being below a load threshold, a battery of the candidate UE being above a battery threshold, or any combination thereof.

The UE 415 may determine that the UE 410 satisfies the criteria to be a suitable relay UE candidate. The UE 415 may determine that the UE 410 has the highest sidelink radio quality of candidate relay UEs, and UE 415 may select the UE 410 to act as the relay UE at 455. In some cases, the UE 415 may measure a sidelink discovery RSRP of the sidelink to UE 410. The UE 415 may apply an L3 filtering for UE 410 to determine the RSRP measurement for UE 410.

At 460, UE 415 and UE 410 may establish relay sidelink communications. For example, the UE 415 may send a direction communication request to the UE 410, and the UE 410 may send a direct security mode command in response. The UE 415 may send a direct security mode complete to the UE 410 and receive a direct communication accept in response to establish the direct (e.g., D2D) relay sidelink communications between the UE 410 and the UE 415. At 465, the UE 415 may communicate with base station 405 via UE 410 as the relay UE.

Figure 5:
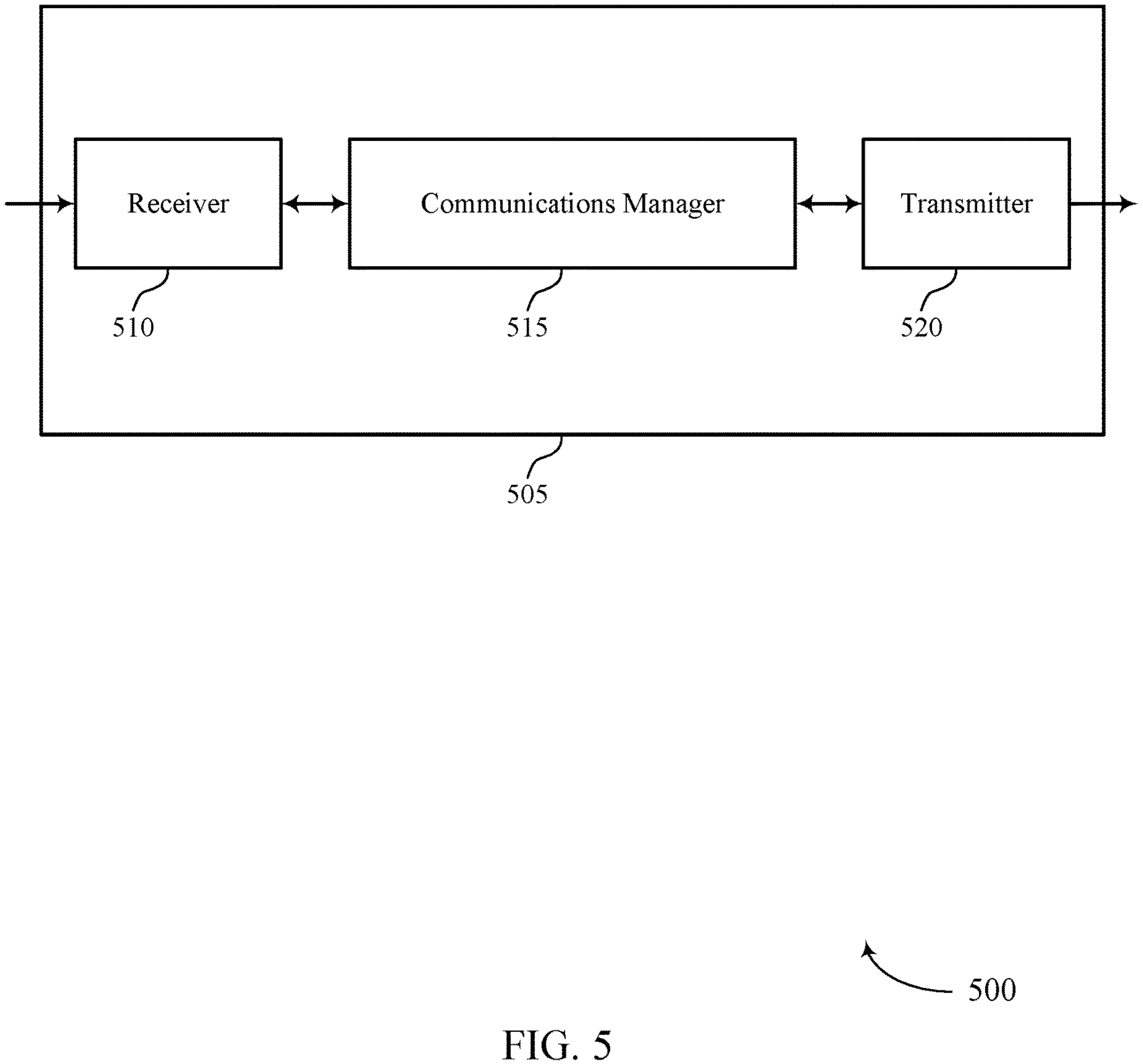
FIGS. 5 and 6 show block diagrams of devices that support techniques for selecting and reselecting sidelink relay in accordance with aspects of the present disclosure.

FIG. 5 shows a block diagram 500 of a device 505 that supports techniques for selecting and reselecting sidelink relay in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for selecting and reselecting sidelink relay, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine to operate as a relay UE based on a set of thresholds configured for the first UE, transmit a relay discovery announcement on a sidelink channel indicating support for relay communications based on the determination to operate as the relay UE, and establish the relay communications with a second UE based on the transmission of the relay discovery announcement on the sidelink channel. The communications manager 515 may also monitor for a relay discovery announcement on a sidelink channel to establish relay communications with a first UE operating as a relay UE, where the relay communications are associated with a quality of service level, receive the relay discovery announcement via a broadcast on the sidelink channel from the first UE, where the first UE supports the quality of service level for the relay communications, and establish the relay communications with the first UE based on receiving the relay discovery announcement. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
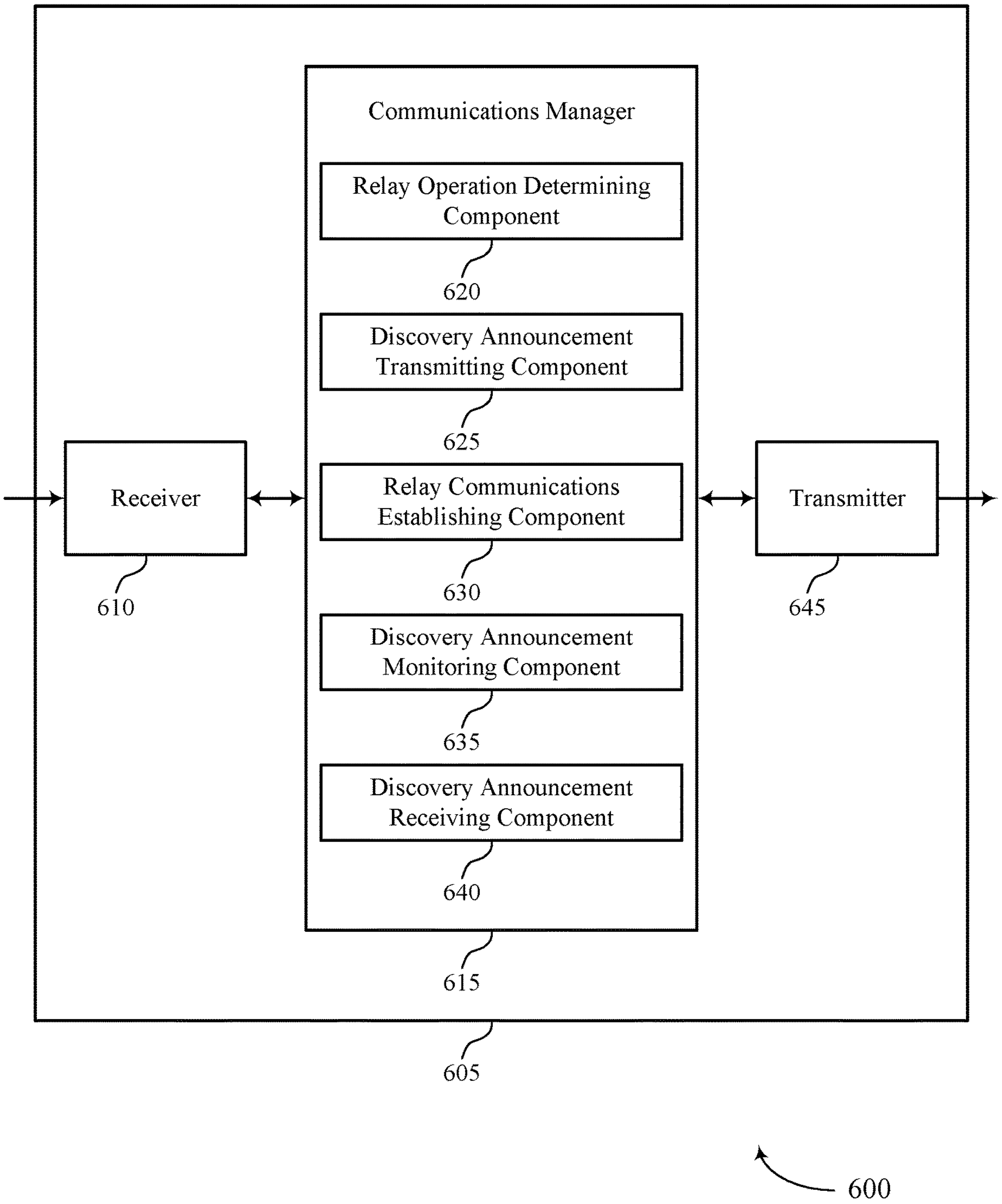

FIG. 6 shows a block diagram 600 of a device 605 that supports techniques for selecting and reselecting sidelink relay in accordance with aspects of the present disclosure.

The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to techniques for selecting and reselecting sidelink relay, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a relay operation determining component 620, a discovery announcement transmitting component 625, a relay communications establishing component 630, a discovery announcement monitoring component 635, and a discovery announcement receiving component 640. The communications manager 615 may be an example of aspects of the communications manager 810 described herein.

The relay operation determining component 620 may determine to operate as a relay UE based on a set of thresholds configured for the first UE. The discovery announcement transmitting component 625 may transmit a relay discovery announcement on a sidelink channel indicating support for relay communications based on the determination to operate as the relay UE. The relay communications establishing component 630 may establish the relay communications with a second UE based on the transmission of the relay discovery announcement on the sidelink channel.

The discovery announcement monitoring component 635 may monitor for a relay discovery announcement on a sidelink channel to establish relay communications with a first UE operating as a relay UE, where the relay communications are associated with a quality of service level. The discovery announcement receiving component 640 may receive the relay discovery announcement via a broadcast on the sidelink channel from the first UE, where the first UE supports the quality of service level for the relay communications. The relay communications establishing component 630 may establish the relay communications with the first UE based on receiving the relay discovery announcement.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
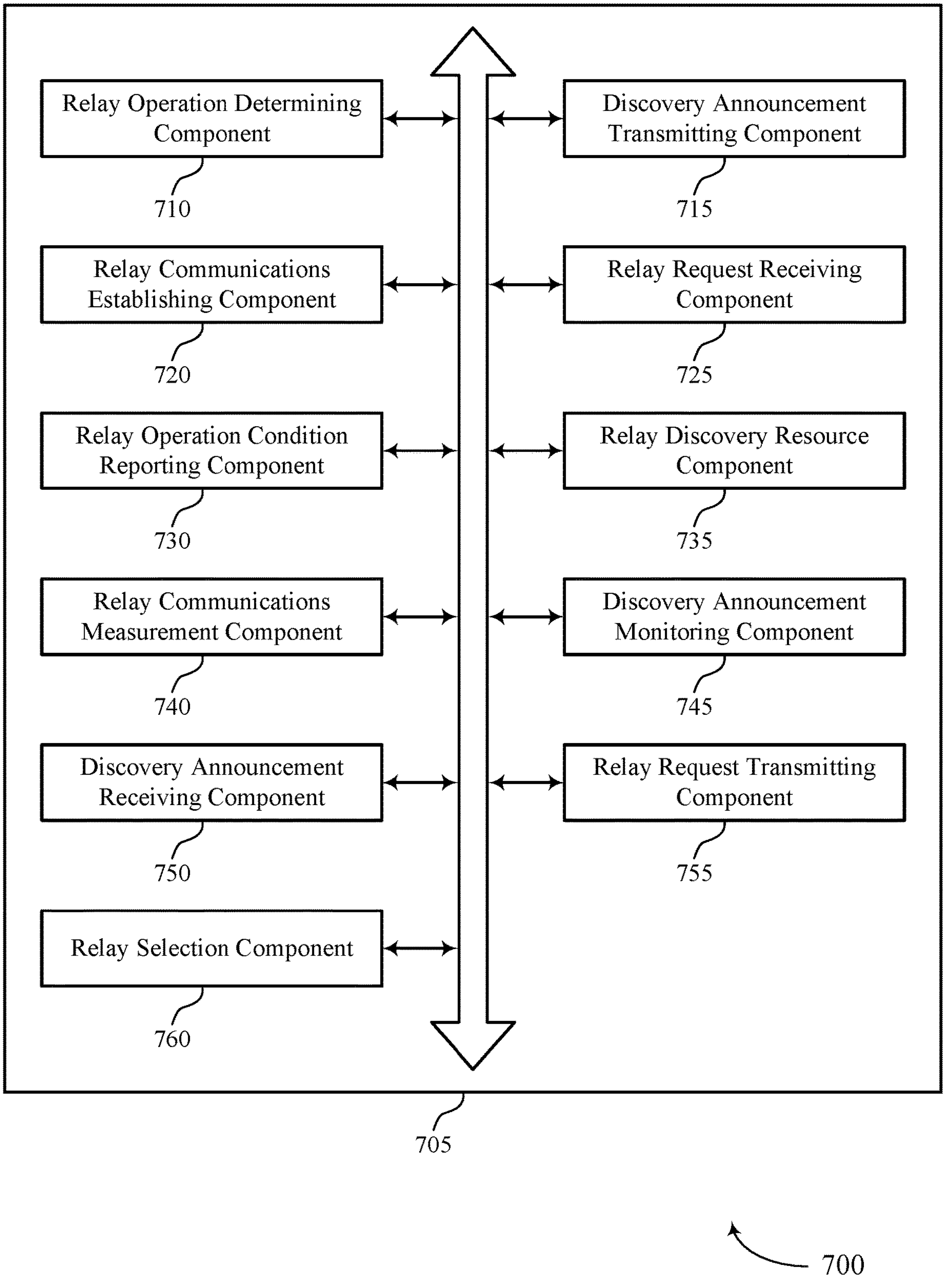
FIG. 7 shows a block diagram of a communications manager that supports techniques for selecting and reselecting sidelink relay in accordance with aspects of the present disclosure.

FIG. 7 shows a block diagram 700 of a communications manager 705 that supports techniques for selecting and reselecting sidelink relay in accordance with aspects of the present disclosure. The communications manager 705 may be an example of aspects of a communications manager 515, a communications manager 615, or a communications manager 810 described herein. The communications manager 705 may include a relay operation determining component 710, a discovery announcement transmitting component 715, a relay communications establishing component 720, a relay request receiving component 725, a relay operation condition reporting component 730, a relay discovery resource component 735, a relay communications measurement component 740, a discovery announcement monitoring component 745, a discovery announcement receiving component 750, a relay request transmitting component 755, and a relay selection component 760. Each of these modules may communicate, directly or indirectly, with one another (e.g., via one or more buses).

The relay operation determining component 710 may determine to operate as a relay UE based on a set of thresholds configured for the first UE. In some examples, the relay operation determining component 710 may receive a radio resource control message from a base station indicating a set of sets of thresholds including the set of thresholds. In some examples, the relay operation determining component 710 may receive, from a base station, a set of quality of service levels, where the relay discovery announcement is transmitted on the sidelink channel based on the set of quality of service levels including the quality service level of the relay communications.

In some examples, the relay operation determining component 710 may receive, from a base station, a radio resource control configuration for a set of resources to transmit the relay discovery announcement on the sidelink channel. In some examples, the relay operation determining component 710 may transmit, to a base station, a relay discovery announcement request including a quality of service level supported by the first UE for relay communications. In some examples, the relay operation determining component 710 may receive, from the base station, a relay discovery announcement response for the relay discovery announcement request, where the transmission of the relay discovery announcement is based on receiving the relay discovery announcement response.

In some cases, the set of sets of thresholds includes a first set of thresholds used when the first UE is not connected to a remote UE and a second set of thresholds used when the first UE is connected to at least one remote UE. In some cases, a difference between a high threshold and a low threshold of the first set of thresholds is smaller than the difference between the high threshold and the low threshold of the second set of thresholds. In some cases, the determination to operate as the relay UE is further based on a mobility state of the first UE.

The discovery announcement transmitting component 715 may transmit a relay discovery announcement on a sidelink channel indicating support for relay communications based on the determination to operate as the relay UE. In some examples, the discovery announcement transmitting component 715 may indicate, to the second UE, a quality of service level supported by the first UE for relay communications based on the transmission of the relay discovery announcement. In some examples, the discovery announcement transmitting component 715 may include an indicator in a PDCP packet of the relay discovery announcement that the relay discovery announcement is associated with relay discovery. In some cases, the quality of service level is indicated by a medium access control element or by an application code associated with a discovery announcement message.

The relay communications establishing component 720 may establish the relay communications with a second UE based on the transmission of the relay discovery announcement on the sidelink channel. In some examples, the relay communications establishing component 720 may establish the relay communications with the first UE based on receiving the relay discovery announcement.

The discovery announcement monitoring component 745 may monitor for a relay discovery announcement on a sidelink channel to establish relay communications with a first UE operating as a relay UE, where the relay communications are associated with a quality of service level. The discovery announcement receiving component 750 may receive the relay discovery announcement via a broadcast on the sidelink channel from the first UE, where the first UE supports the quality of service level for the relay communications. In some examples, the discovery announcement receiving component 750 may identify an indicator that the relay discovery announcement is associated with relay discovery in PDCP packet of the relay discovery announcement.

The relay request receiving component 725 may receive, from the second UE on the sidelink channel, a relay request to operate as the relay UE for the second UE, where the determination to operate as the relay UE is based on receiving the relay request. In some examples, the relay request receiving component 725 may indicate, to the second UE, load information for the first UE, battery information for the first UE, a quality of service level supported for the relay communications, or a combination thereof, where the relay request is received based on the indication. The relay operation condition reporting component 730 may report, to a base station, a reference signal measurement, load information for the first UE, battery information for the first UE, or any combination thereof. In some examples, the relay operation condition reporting component 730 may receive, from the base station, an indication to transmit the relay discovery announcement based on the reporting. In some cases, the load information includes a channel busy rate for the sidelink channel for the first UE. In some cases, the reference signal measurement, the load information, the battery information, or any combination thereof, is transmitted in a measurement report for radio resource management.

The relay discovery resource component 735 may receive, from a base station, downlink control information scheduling the first UE a set of resources to transmit the relay discovery announcement on the sidelink channel. The relay communications measurement component 740 may receive, from the second UE on the sidelink channel, a measurement report of the sidelink channel based on an L3 filtering of a reference signal measurement. In some examples, the relay communications measurement component 740 may measure a reference signal received from the first UE. In some examples, the relay communications measurement component 740 may filter the reference signal based on an identifier of the first UE. In some examples, the relay communications measurement component 740 may transmit a measurement report for the reference signal to the first UE based on the filtering.

The relay request transmitting component 755 may determine to establish relay communications with a base station. In some examples, the relay request transmitting component 755 may transmit a relay discovery announcement request including a quality of service level for the relay communications. In some examples, the relay request transmitting component 755 may receive a relay discovery announcement response based on transmitting the relay discovery announcement request. In some examples, the relay request transmitting component 755 may transmit a relay request on the sidelink channel to the first UE for the first UE to operate as the relay UE based on the relay discovery announcement response, where the relay discovery announcement is received based on transmitting the relay request.

The relay selection component 760 may receive an indication that the first UE supports the quality of service level for the relay communications. In some examples, the relay selection component 760 may select the first UE as the relay UE for the relay communications. In some examples, the relay selection component 760 may receive an indication that the first UE supports the quality of service level of the relay communications, where the selection is based on the indication. In some examples, the relay selection component 760 may receive an indication of a load of the first UE, where the first UE is selected based on the load of the first UE being below a load threshold.

In some examples, the relay selection component 760 may receive a system information block including the load threshold. In some examples, the relay selection component 760 may receive an indication of a battery level of the first UE, where the first UE is selected based on the battery level being above a battery threshold. In some examples, the relay selection component 760 may receive a system information block including the battery threshold. In some examples, the relay selection component 760 may determine the third UE cannot support the quality of service level for the relay communications, where the relay communications are established with the first UE based on the determination. In some cases, the indication is received via a medium access control element or by an application code associated with a relay discovery message. In some cases, the relay communications are established with the first UE based on the first UE providing the quality of service level for the relay communications, a load of the first UE satisfying a load threshold, a battery level of the first UE satisfying a battery threshold, or a combination thereof.

Figure 8:
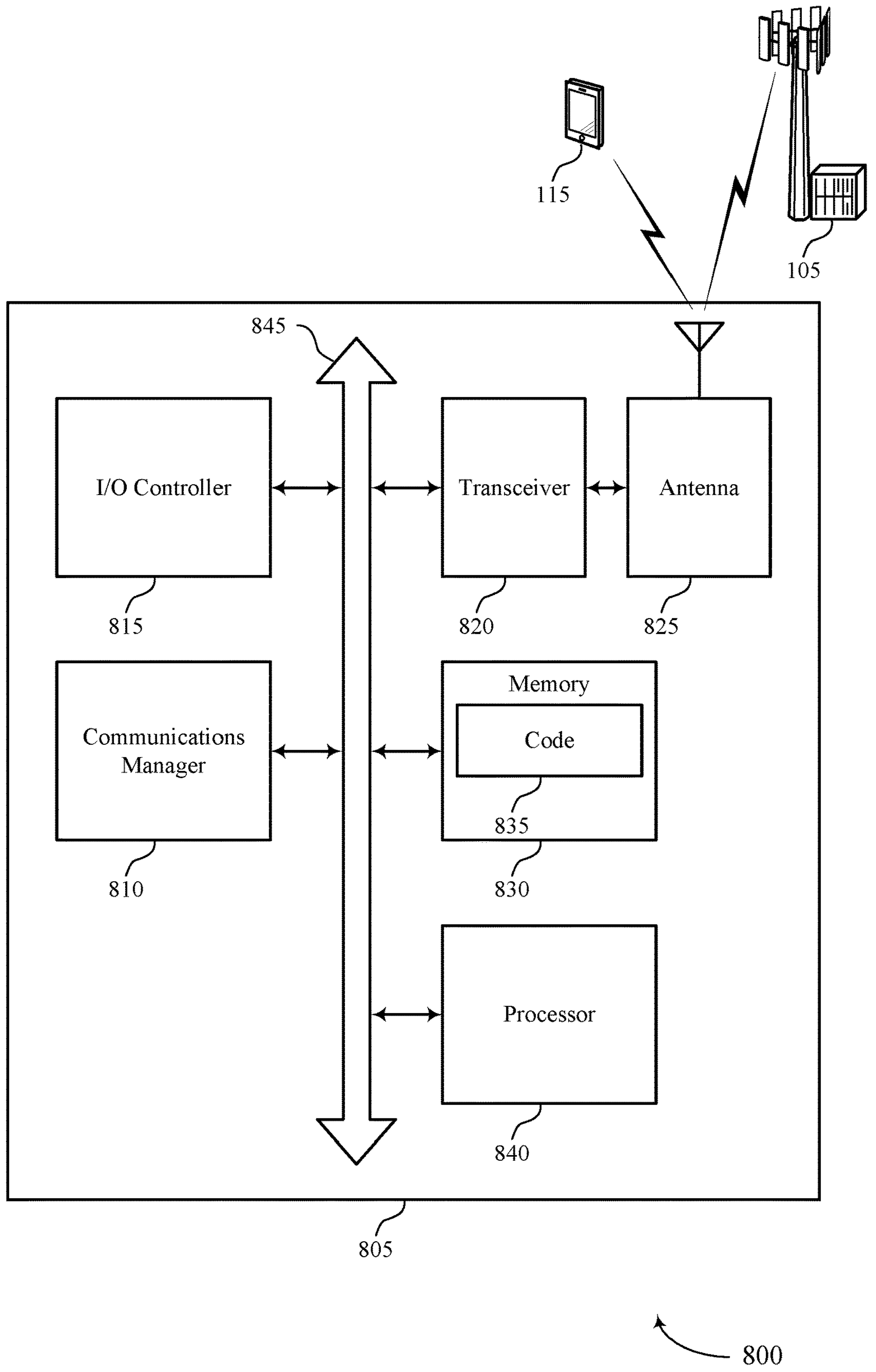
FIG. 8 shows a diagram of a system including a device that supports techniques for selecting and reselecting sidelink relay in accordance with aspects of the present disclosure.

FIG. 8 shows a diagram of a system 800 including a device 805 that supports techniques for selecting and reselecting sidelink relay in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine to operate as a relay UE based on a set of thresholds configured for the first UE, transmit a relay discovery announcement on a sidelink channel indicating support for relay communications based on the determination to operate as the relay UE, and establish the relay communications with a second UE based on the transmission of the relay discovery announcement on the sidelink channel. The communications manager 810 may also monitor for a relay discovery announcement on a sidelink channel to establish relay communications with a first UE operating as a relay UE, where the relay communications are associated with a quality of service level, receive the relay discovery announcement via a broadcast on the sidelink channel from the first UE, where the first UE supports the quality of service level for the relay communications, and establish the relay communications with the first UE based on receiving the relay discovery announcement.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for selecting and reselecting sidelink relay).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
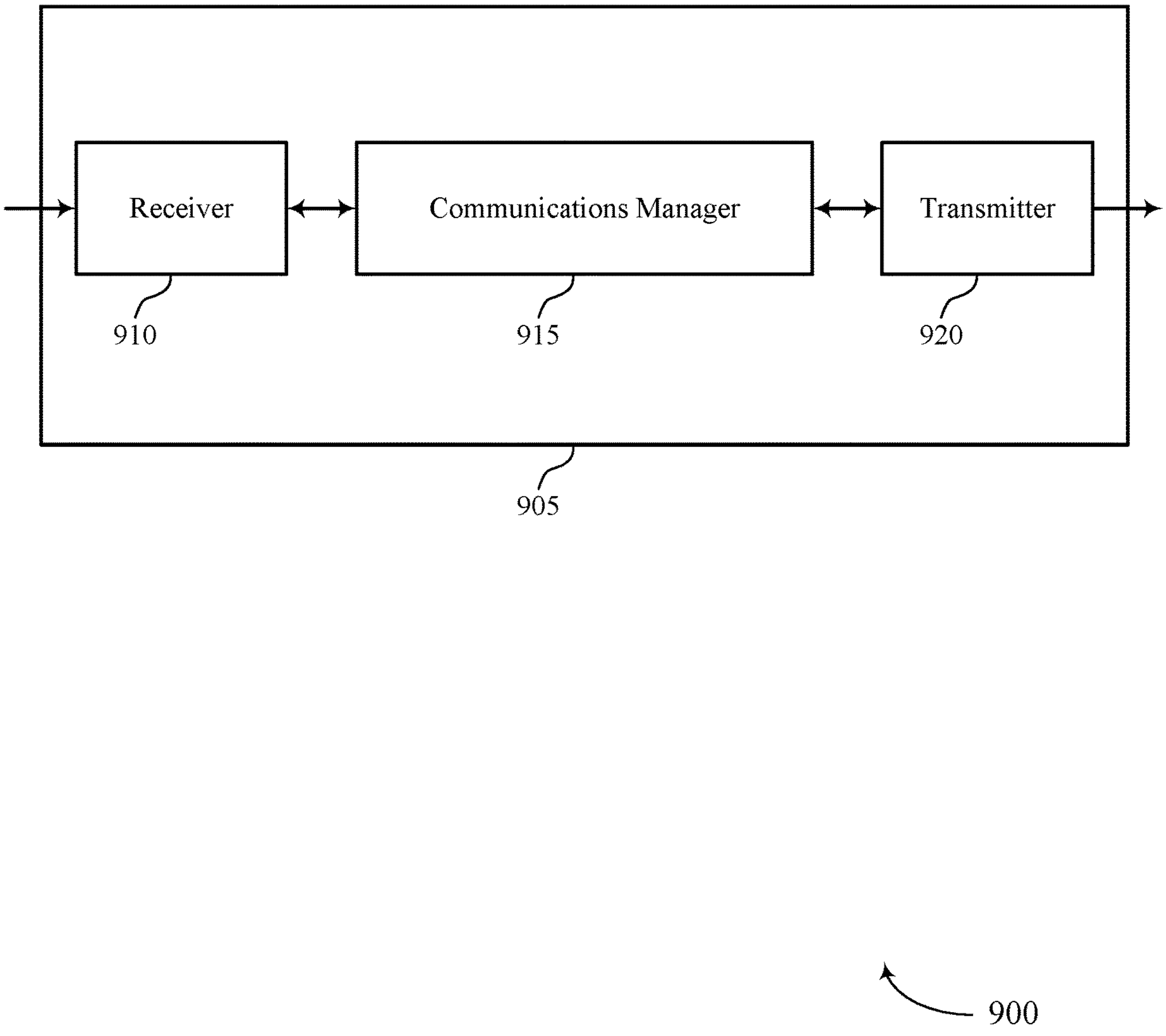
FIGS. 9 and 10 show block diagrams of devices that support techniques for selecting and reselecting sidelink relay in accordance with aspects of the present disclosure.

FIG. 9 shows a block diagram 900 of a device 905 that supports techniques for selecting and reselecting sidelink relay in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for selecting and reselecting sidelink relay, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a relay discovery request message including a quality of service level for relay communications between a first UE and a second UE, transmit a relay discovery response message including an application code for relay discovery based on the quality of service level for the relay communications, configure the first UE with a set of resources on a sidelink channel for a relay discovery announcement on the sidelink channel, and receive, from the first UE, data for the second UE based on the relay communications between the first UE and the second UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
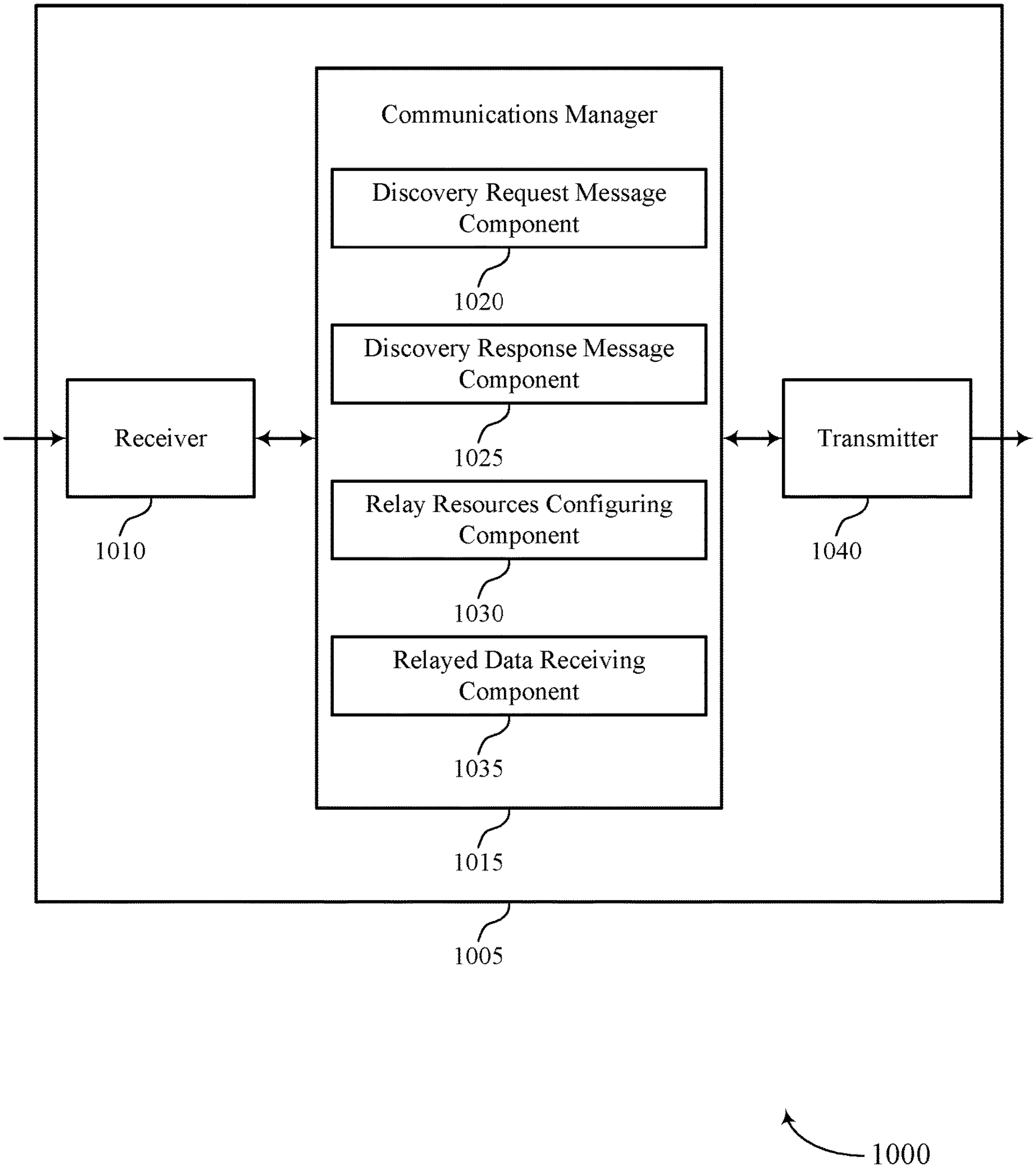

FIG. 10 shows a block diagram 1000 of a device 1005 that supports techniques for selecting and reselecting sidelink relay in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for selecting and reselecting sidelink relay, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a discovery request message component 1020, a discovery response message component 1025, a relay resources configuring component 1030, and a relayed data receiving component 1035. The communications manager 1015 may be an example of aspects of the communications manager 1210 described herein.

The discovery request message component 1020 may receive a relay discovery request message including a quality of service level for relay communications between a first UE and a second UE. The discovery response message component 1025 may transmit a relay discovery response message including an application code for relay discovery based on the quality of service level for the relay communications. The relay resources configuring component 1030 may configure the first UE with a set of resources on a sidelink channel for a relay discovery announcement on the sidelink channel.

The relayed data receiving component 1035 may receive, from the first UE, data for the second UE based on the relay communications between the first UE and the second UE.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
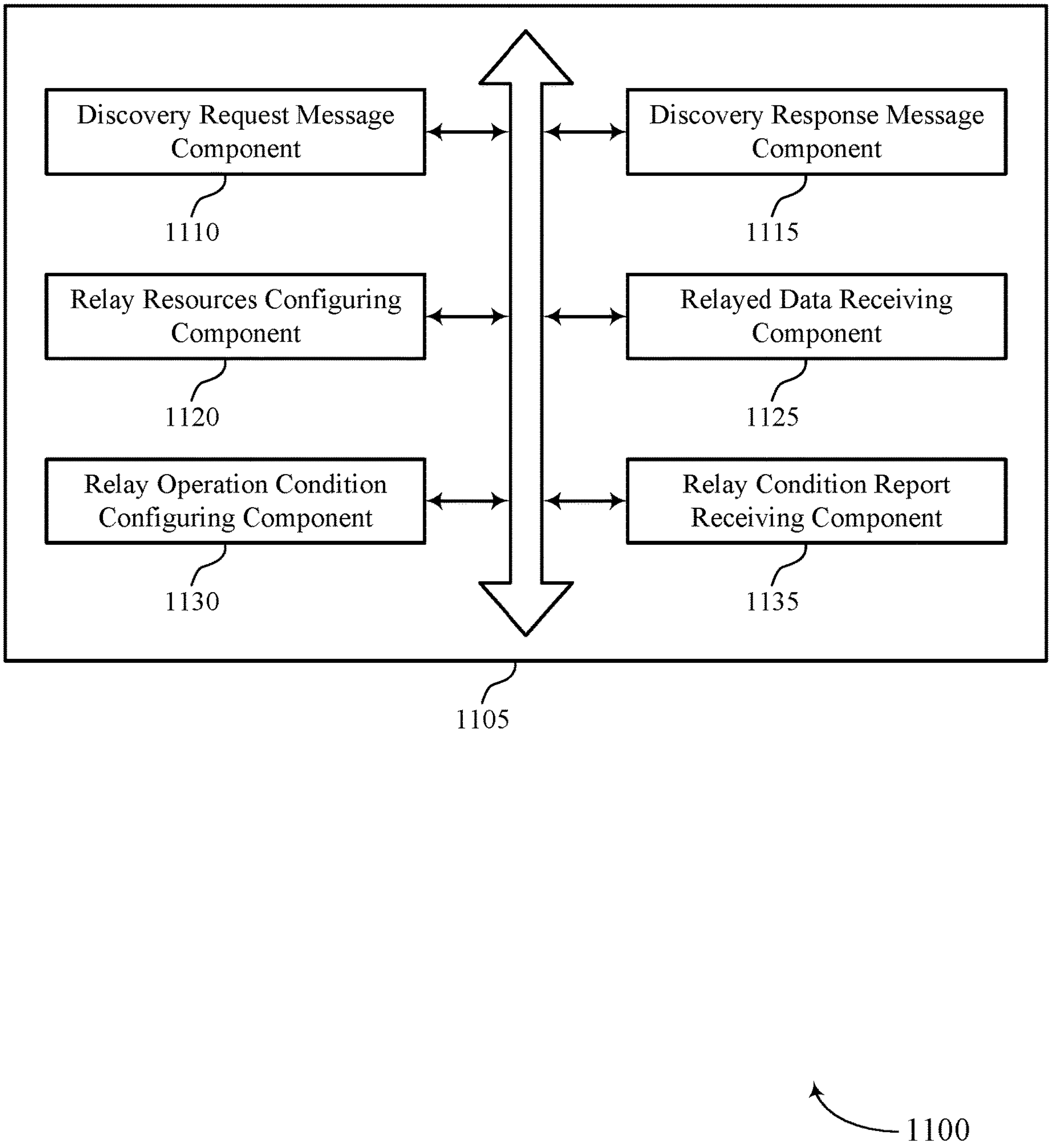
FIG. 11 shows a block diagram of a communications manager that supports techniques for selecting and reselecting sidelink relay in accordance with aspects of the present disclosure.

FIG. 11 shows a block diagram 1100 of a communications manager 1105 that supports techniques for selecting and reselecting sidelink relay in accordance with aspects of the present disclosure. The communications manager 1105 may be an example of aspects of a communications manager 915, a communications manager 1015, or a communications manager 1210 described herein. The communications manager 1105 may include a discovery request message component 1110, a discovery response message component 1115, a relay resources configuring component 1120, a relayed data receiving component 1125, a relay operation condition configuring component 1130, and a relay condition report receiving component 1135. Each of these modules may communicate, directly or indirectly, with one another (e.g., via one or more buses).

The discovery request message component 1110 may receive a relay discovery request message including a quality of service level for relay communications between a first UE and a second UE. The discovery response message component 1115 may transmit a relay discovery response message including an application code for relay discovery based on the quality of service level for the relay communications. In some examples, the discovery response message component 1115 may indicate the quality of service level for the relay communications based on the application code for the relay discovery. In some cases, the relay discovery request message is received from the first UE, and the relay discovery response message is transmitted to the first UE. In some cases, the relay discovery request message is received from the second UE, and the relay discovery response message is transmitted to the second UE.

The relay resources configuring component 1120 may configure the first UE with a set of resources on a sidelink channel for a relay discovery announcement on the sidelink channel. In some examples, the relay resources configuring component 1120 may transmit an indication via downlink control information that the set of resources are configured for discovery signaling. In some examples, the relay resources configuring component 1120 may transmit an indication via radio resource control signaling that the set of resources are configured for discovery signaling.

The relayed data receiving component 1125 may receive, from the first UE, data for the second UE based on the relay communications between the first UE and the second UE.

The relay operation condition configuring component 1130 may transmit, to the first UE, a radio resource control message indicating a set of sets of thresholds. In some examples, the relay operation condition configuring component 1130 may configure the first UE with a set of quality of service levels, where the first UE is configured to perform discovery for the relay communications based on the set of quality of service levels including the quality service level of the relay communications. In some cases, the set of sets of thresholds includes a first set of thresholds used when the first UE is not connected to a remote UE and a second set of thresholds used when the first UE is connected to at least one remote UE. In some cases, a difference between a high threshold and a low threshold of the first set of thresholds is smaller than the difference between a high threshold and a low threshold of the second set of thresholds.

The relay condition report receiving component 1135 may receive, from the first UE, a reference signal measurement, load information for the first UE, battery information for the first UE, or any combination thereof. In some examples, the relay condition report receiving component 1135 may transmit an indication for the first UE to broadcast the relay discovery announcement based on the reporting. In some cases, the load information includes a channel busy rate for the sidelink channel for the first UE. In some cases, the reference signal measurement, the load information, or the battery information, or any combination thereof, is received in a measurement report for radio resource management.

Figure 12:
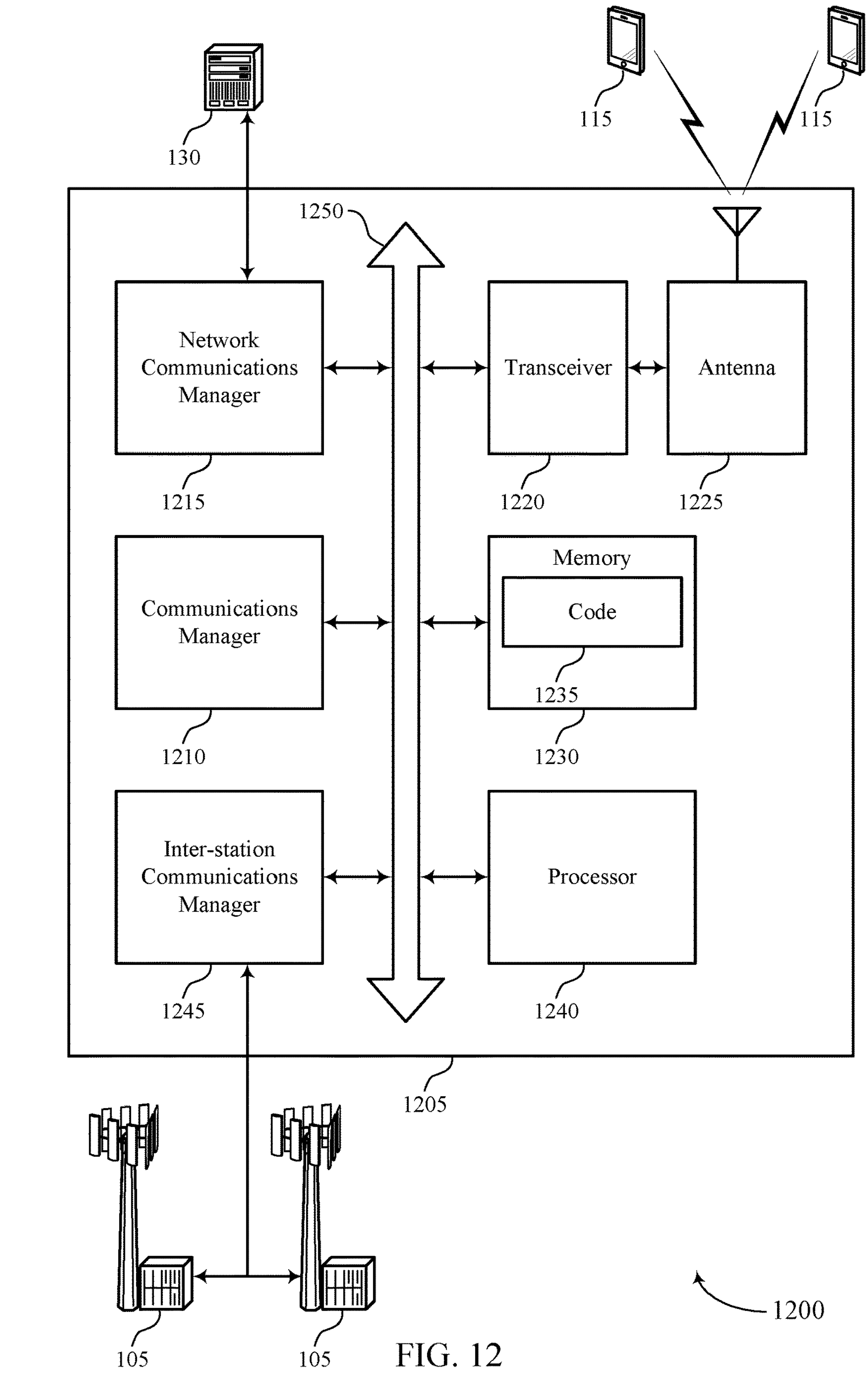
FIG. 12 shows a diagram of a system including a device that supports techniques for selecting and reselecting sidelink relay in accordance with aspects of the present disclosure.

FIG. 12 shows a diagram of a system 1200 including a device 1205 that supports techniques for selecting and reselecting sidelink relay in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a relay discovery request message including a quality of service level for relay communications between a first UE and a second UE, transmit a relay discovery response message including an application code for relay discovery based on the quality of service level for the relay communications, configure the first UE with a set of resources on a sidelink channel for a relay discovery announcement on the sidelink channel, and receive, from the first UE, data for the second UE based on the relay communications between the first UE and the second UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for selecting and reselecting sidelink relay).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
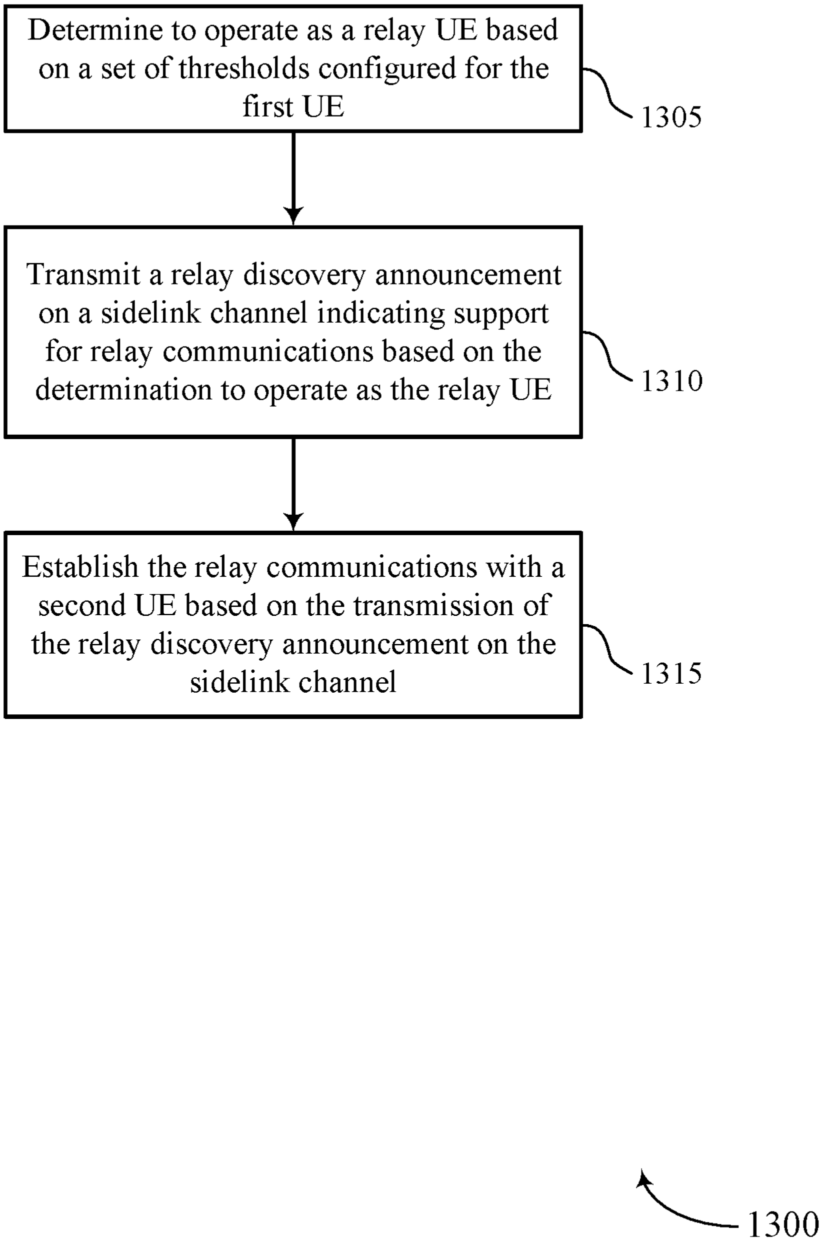
FIGS. 13 through 20 show flowcharts illustrating methods that support techniques for selecting and reselecting sidelink relay in accordance with aspects of the present disclosure.

FIG. 13 shows a flowchart illustrating a method 1300 that supports techniques for selecting and reselecting sidelink relay in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may determine to operate as a relay UE based on a set of thresholds configured for the first UE. The operations of 1305 may be performed according to the methods described herein. In some examples, aspects of the operations of 1305 may be performed by a relay operation determining component as described with reference to FIGS. 5 through 8.

At 1310, the UE may transmit a relay discovery announcement on a sidelink channel indicating support for relay communications based on the determination to operate as the relay UE. The operations of 1310 may be performed according to the methods described herein. In some examples, aspects of the operations of 1310 may be performed by a discovery announcement transmitting component as described with reference to FIGS. 5 through 8.

At 1315, the UE may establish the relay communications with a second UE based on the transmission of the relay discovery announcement on the sidelink channel. The operations of 1315 may be performed according to the methods described herein. In some examples, aspects of the operations of 1315 may be performed by a relay communications establishing component as described with reference to FIGS. 5 through 8.

Figure 14:
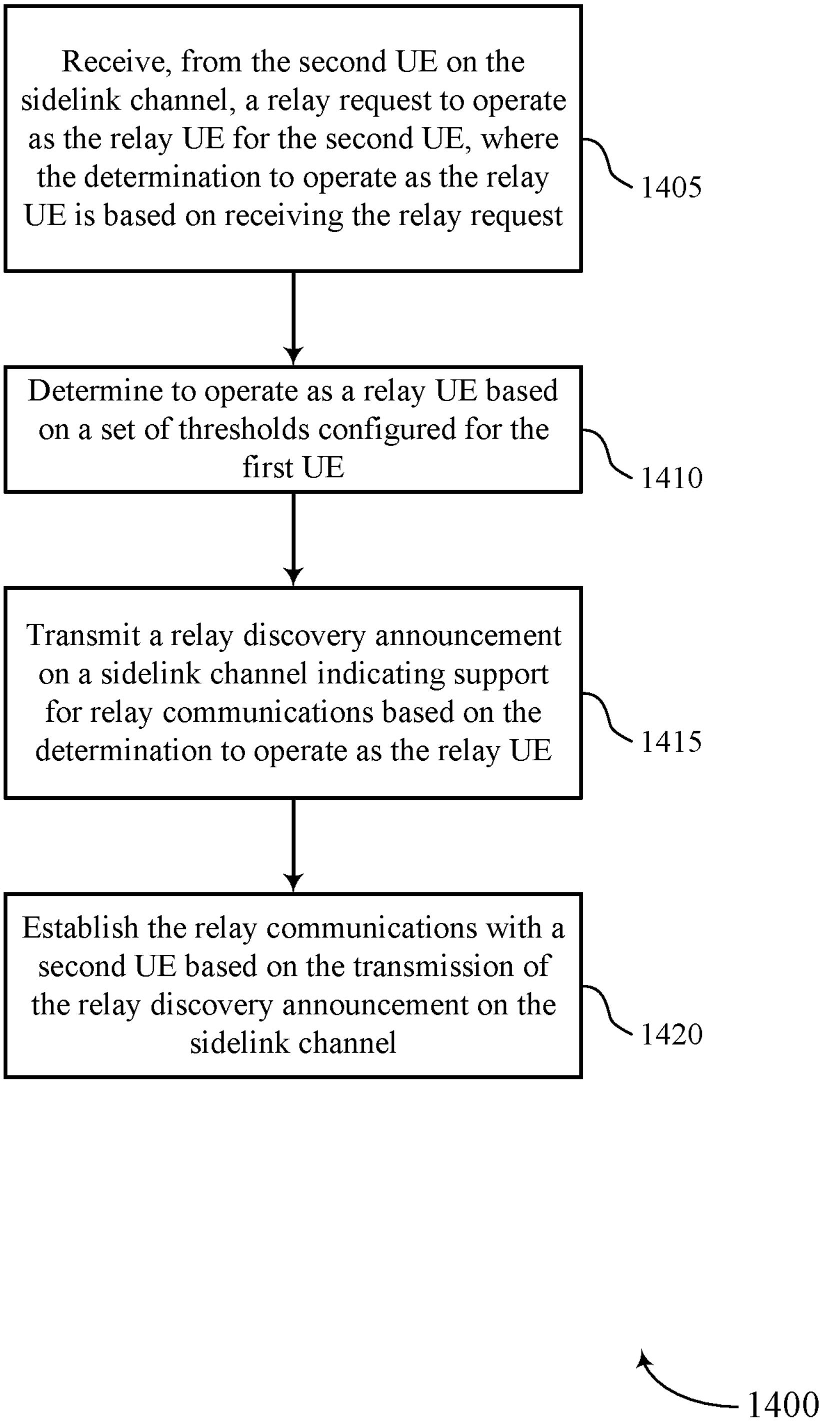

FIG. 14 shows a flowchart illustrating a method 1400 that supports techniques for selecting and reselecting sidelink relay in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1405, the UE may receive, from the second UE on the sidelink channel, a relay request to operate as the relay UE for the second UE, where the determination to operate as the relay UE is based on receiving the relay request. The operations of 1405 may be performed according to the methods described herein. In some examples, aspects of the operations of 1405 may be performed by a relay request receiving component as described with reference to FIGS. 5 through 8.

At 1410, the UE may determine to operate as a relay UE based on a set of thresholds configured for the first UE. The operations of 1410 may be performed according to the methods described herein. In some examples, aspects of the operations of 1410 may be performed by a relay operation determining component as described with reference to FIGS. 5 through 8.

At 1415, the UE may transmit a relay discovery announcement on a sidelink channel indicating support for relay communications based on the determination to operate as the relay UE. The operations of 1415 may be performed according to the methods described herein. In some examples, aspects of the operations of 1415 may be performed by a discovery announcement transmitting component as described with reference to FIGS. 5 through 8.

At 1420, the UE may establish the relay communications with a second UE based on the transmission of the relay discovery announcement on the sidelink channel. The operations of 1420 may be performed according to the methods described herein. In some examples, aspects of the operations of 1420 may be performed by a relay communications establishing component as described with reference to FIGS. 5 through 8.

Figure 15:
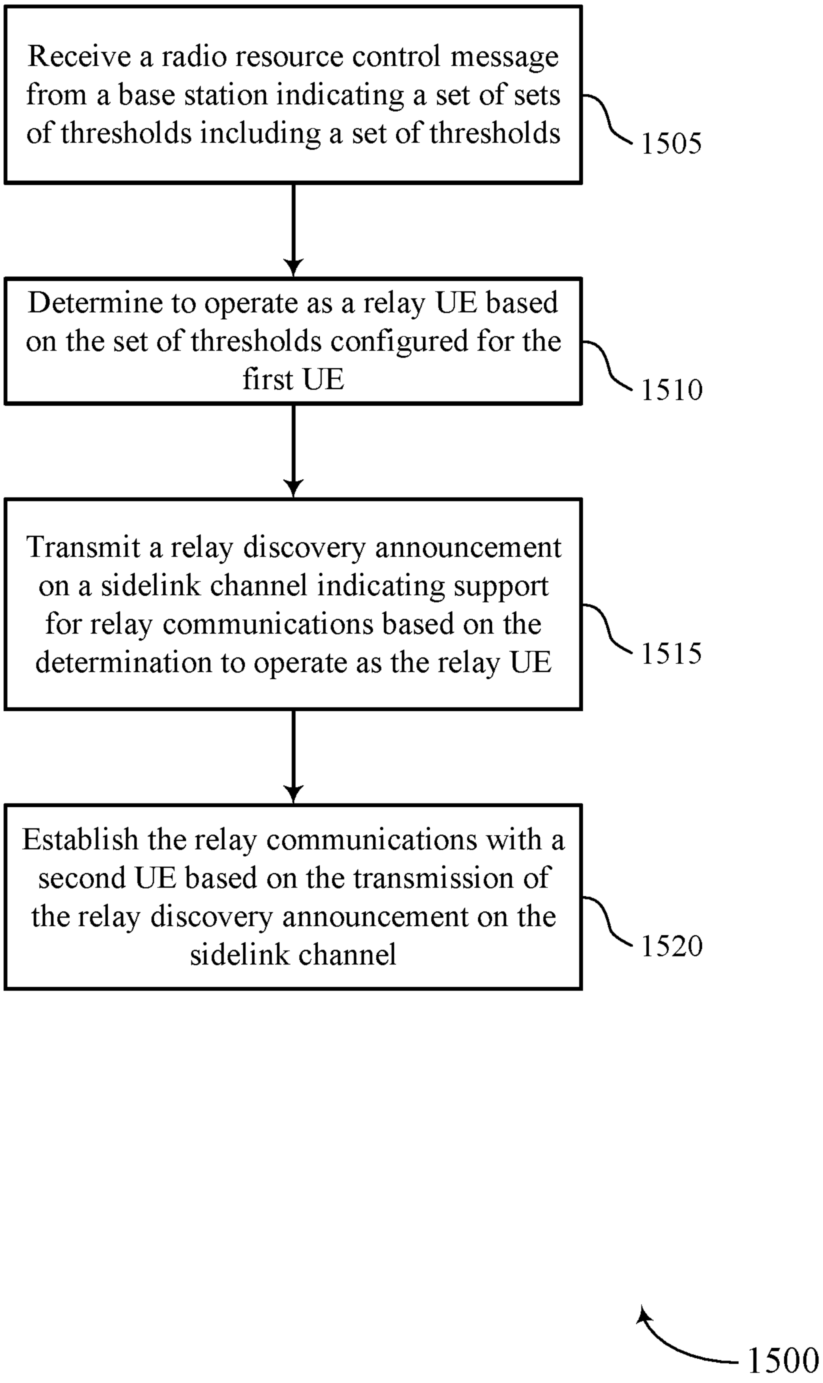

FIG. 15 shows a flowchart illustrating a method 1500 that supports techniques for selecting and reselecting sidelink relay in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1505, the UE may receive a radio resource control message from a base station indicating a set of sets of thresholds including the set of thresholds. The operations of 1505 may be performed according to the methods described herein. In some examples, aspects of the operations of 1505 may be performed by a relay operation determining component as described with reference to FIGS. 5 through 8.

At 1510, the UE may determine to operate as a relay UE based on a set of thresholds configured for the first UE. The operations of 1510 may be performed according to the methods described herein. In some examples, aspects of the operations of 1510 may be performed by a relay operation determining component as described with reference to FIGS. 5 through 8.

At 1515, the UE may transmit a relay discovery announcement on a sidelink channel indicating support for relay communications based on the determination to operate as the relay UE. The operations of 1515 may be performed according to the methods described herein. In some examples, aspects of the operations of 1515 may be performed by a discovery announcement transmitting component as described with reference to FIGS. 5 through 8.

At 1520, the UE may establish the relay communications with a second UE based on the transmission of the relay discovery announcement on the sidelink channel. The operations of 1520 may be performed according to the methods described herein. In some examples, aspects of the operations of 1520 may be performed by a relay communications establishing component as described with reference to FIGS. 5 through 8.

Figure 16:
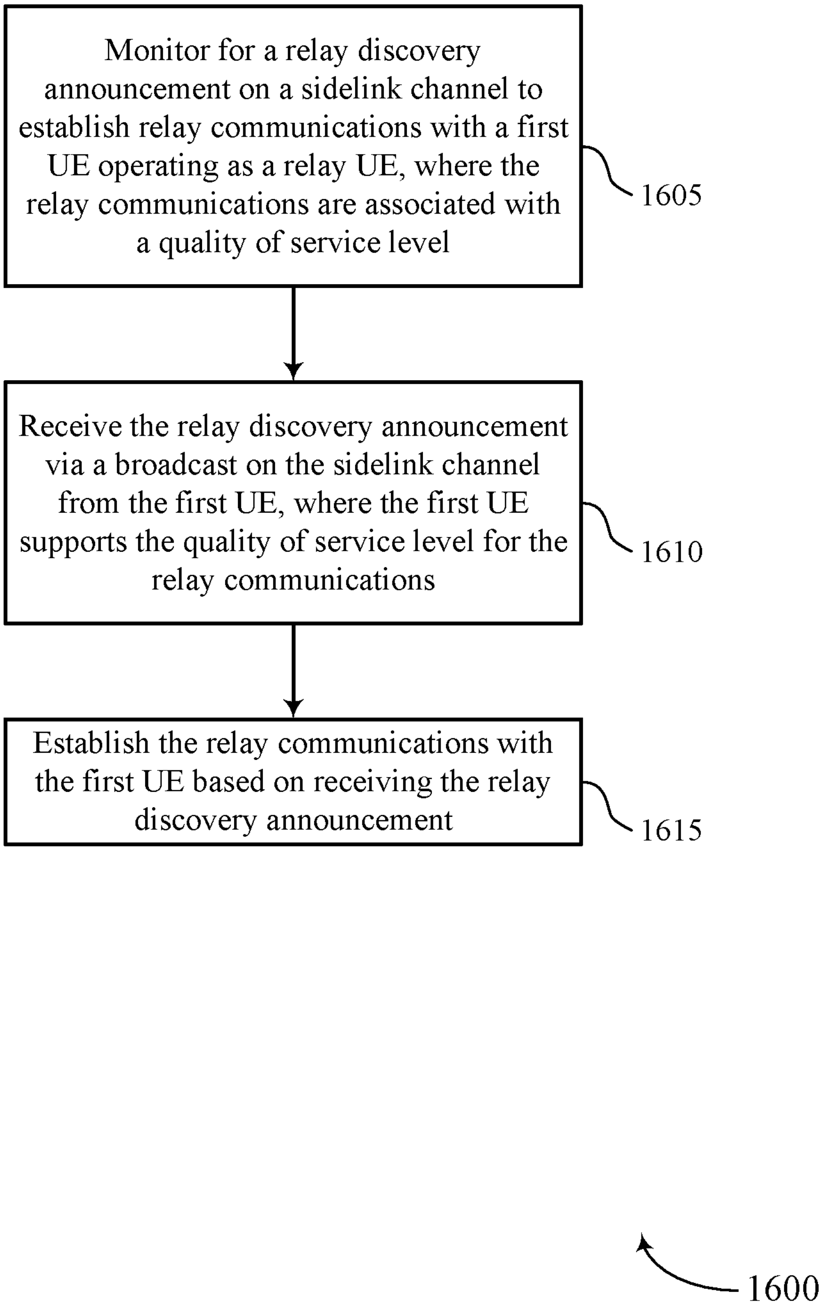

FIG. 16 shows a flowchart illustrating a method 1600 that supports techniques for selecting and reselecting sidelink relay in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1605, the UE may monitor for a relay discovery announcement on a sidelink channel to establish relay communications with a first UE operating as a relay UE, where the relay communications are associated with a quality of service level. The operations of 1605 may be performed according to the methods described herein. In some examples, aspects of the operations of 1605 may be performed by a discovery announcement monitoring component as described with reference to FIGS. 5 through 8.

At 1610, the UE may receive the relay discovery announcement via a broadcast on the sidelink channel from the first UE, where the first UE supports the quality of service level for the relay communications. The operations of 1610 may be performed according to the methods described herein. In some examples, aspects of the operations of 1610 may be performed by a discovery announcement receiving component as described with reference to FIGS. 5 through 8.

At 1615, the UE may establish the relay communications with the first UE based on receiving the relay discovery announcement. The operations of 1615 may be performed according to the methods described herein. In some examples, aspects of the operations of 1615 may be performed by a relay communications establishing component as described with reference to FIGS. 5 through 8.

Figure 17:
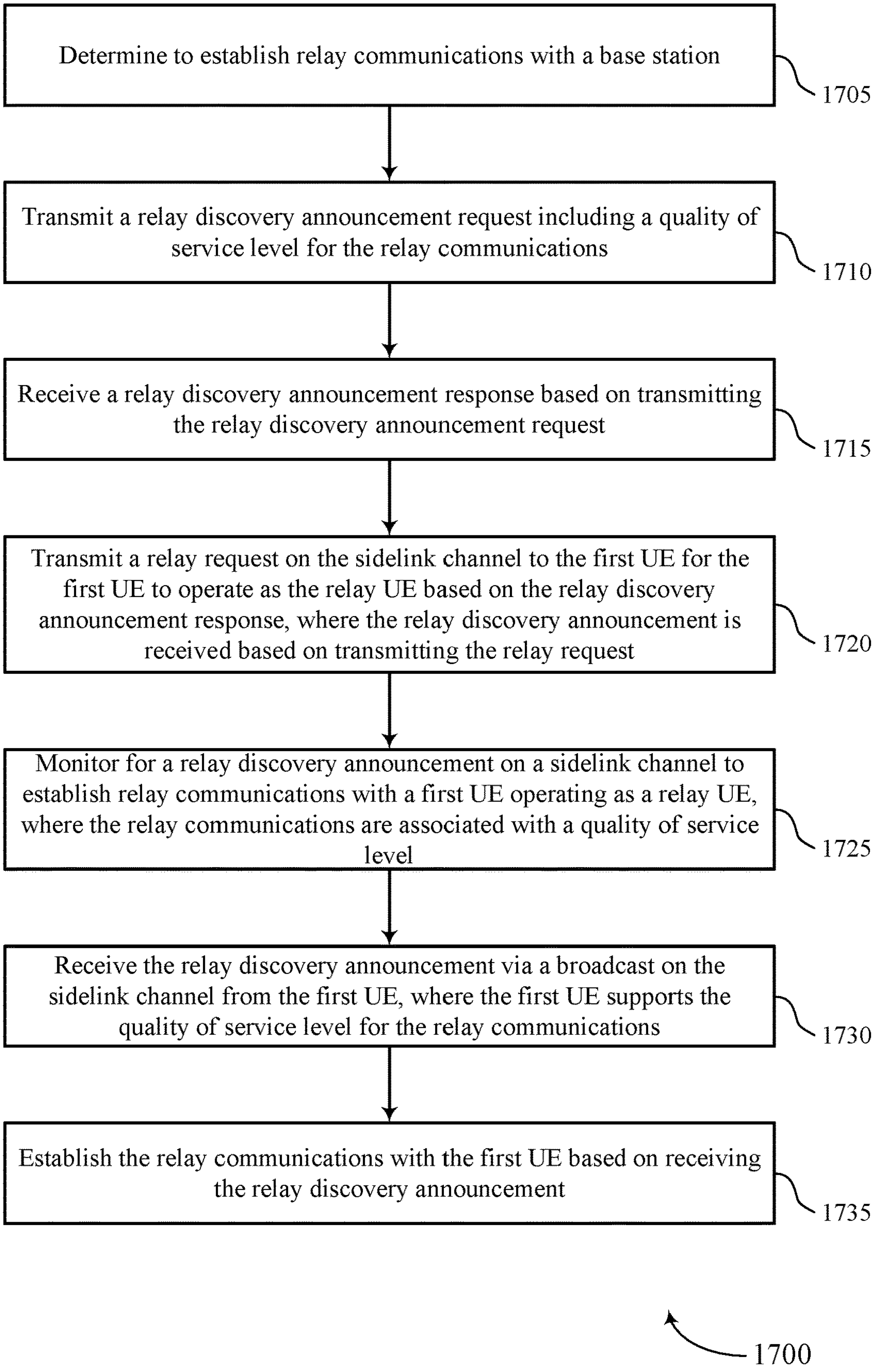

FIG. 17 shows a flowchart illustrating a method 1700 that supports techniques for selecting and reselecting sidelink relay in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1705, the UE may determine to establish relay communications with a base station. The operations of 1705 may be performed according to the methods described herein. In some examples, aspects of the operations of 1705 may be performed by a relay request transmitting component as described with reference to FIGS. 5 through 8.

At 1710, the UE may transmit a relay discovery announcement request including a quality of service level for the relay communications. The operations of 1710 may be performed according to the methods described herein. In some examples, aspects of the operations of 1710 may be performed by a relay request transmitting component as described with reference to FIGS. 5 through 8.

At 1715, the UE may receive a relay discovery announcement response based on transmitting the relay discovery announcement request. The operations of 1715 may be performed according to the methods described herein. In some examples, aspects of the operations of 1715 may be performed by a relay request transmitting component as described with reference to FIGS. 5 through 8.

At 1720, the UE may transmit a relay request on the sidelink channel to the first UE for the first UE to operate as the relay UE based on the relay discovery announcement response, where the relay discovery announcement is received based on transmitting the relay request. The operations of 1720 may be performed according to the methods described herein. In some examples, aspects of the operations of 1720 may be performed by a relay request transmitting component as described with reference to FIGS. 5 through 8.

At 1725, the UE may monitor for a relay discovery announcement on a sidelink channel to establish relay communications with a first UE operating as a relay UE, where the relay communications are associated with a quality of service level. The operations of 1725 may be performed according to the methods described herein. In some examples, aspects of the operations of 1725 may be performed by a discovery announcement monitoring component as described with reference to FIGS. 5 through 8.

At 1730, the UE may receive the relay discovery announcement via a broadcast on the sidelink channel from the first UE, where the first UE supports the quality of service level for the relay communications. The operations of 1730 may be performed according to the methods described herein. In some examples, aspects of the operations of 1730 may be performed by a discovery announcement receiving component as described with reference to FIGS. 5 through 8.

At 1735, the UE may establish the relay communications with the first UE based on receiving the relay discovery announcement. The operations of 1735 may be performed according to the methods described herein. In some examples, aspects of the operations of 1735 may be performed by a relay communications establishing component as described with reference to FIGS. 5 through 8.

Figure 18:
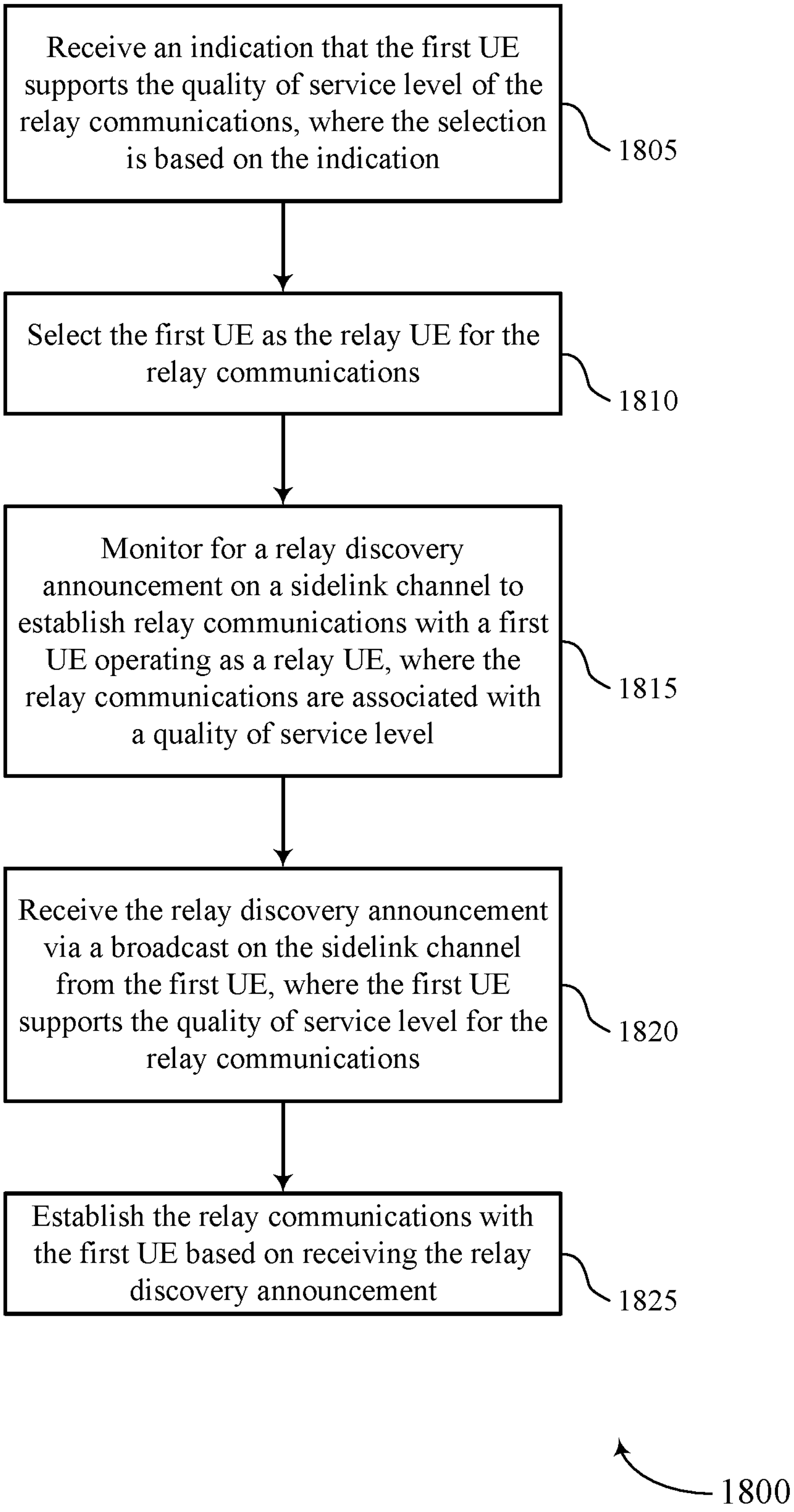

FIG. 18 shows a flowchart illustrating a method 1800 that supports techniques for selecting and reselecting sidelink relay in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1805, the UE may receive an indication that the first UE supports the quality of service level of the relay communications, where the selection is based on the indication. The operations of 1805 may be performed according to the methods described herein. In some examples, aspects of the operations of 1805 may be performed by a relay selection component as described with reference to FIGS. 5 through 8.

At 1810, the UE may select the first UE as the relay UE for the relay communications. The operations of 1810 may be performed according to the methods described herein. In some examples, aspects of the operations of 1810 may be performed by a relay selection component as described with reference to FIGS. 5 through 8.

At 1815, the UE may monitor for a relay discovery announcement on a sidelink channel to establish relay communications with a first UE operating as a relay UE, where the relay communications are associated with a quality of service level. The operations of 1815 may be performed according to the methods described herein. In some examples, aspects of the operations of 1815 may be performed by a discovery announcement monitoring component as described with reference to FIGS. 5 through 8.

At 1820, the UE may receive the relay discovery announcement via a broadcast on the sidelink channel from the first UE, where the first UE supports the quality of service level for the relay communications. The operations of 1820 may be performed according to the methods described herein. In some examples, aspects of the operations of 1820 may be performed by a discovery announcement receiving component as described with reference to FIGS. 5 through 8.

At 1825, the UE may establish the relay communications with the first UE based on receiving the relay discovery announcement. The operations of 1825 may be performed according to the methods described herein. In some examples, aspects of the operations of 1825 may be performed by a relay communications establishing component as described with reference to FIGS. 5 through 8.

Figure 19:
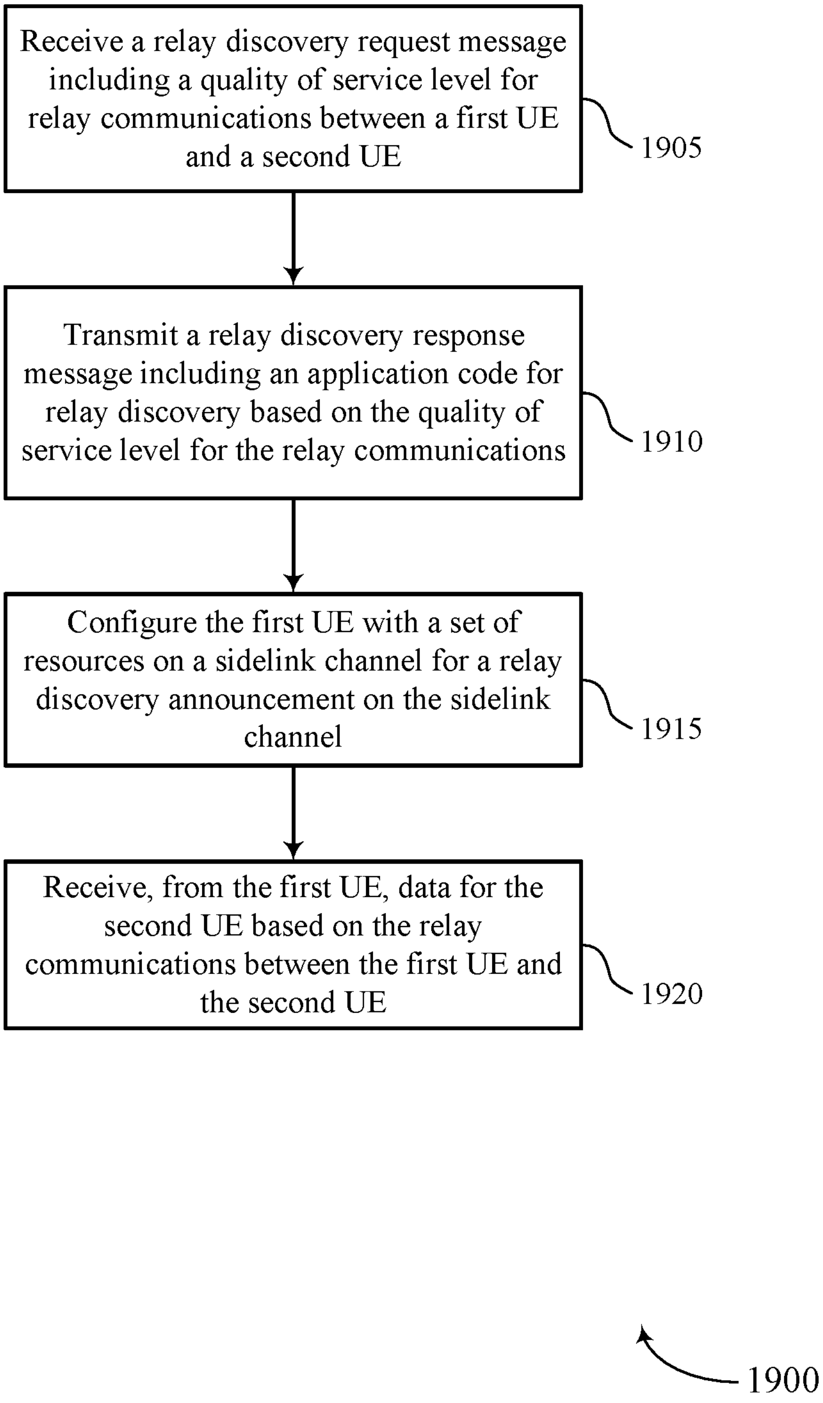

FIG. 19 shows a flowchart illustrating a method 1900 that supports techniques for selecting and reselecting sidelink relay in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1905, the base station may receive a relay discovery request message including a quality of service level for relay communications between a first UE and a second UE. The operations of 1905 may be performed according to the methods described herein. In some examples, aspects of the operations of 1905 may be performed by a discovery request message component as described with reference to FIGS. 9 through 12.

At 1910, the base station may transmit a relay discovery response message including an application code for relay discovery based on the quality of service level for the relay communications. The operations of 1910 may be performed according to the methods described herein. In some examples, aspects of the operations of 1910 may be performed by a discovery response message component as described with reference to FIGS. 9 through 12.

At 1915, the base station may configure the first UE with a set of resources on a sidelink channel for a relay discovery announcement on the sidelink channel. The operations of 1915 may be performed according to the methods described herein. In some examples, aspects of the operations of 1915 may be performed by a relay resources configuring component as described with reference to FIGS. 9 through 12.

At 1920, the base station may receive, from the first UE, data for the second UE based on the relay communications between the first UE and the second UE. The operations of 1920 may be performed according to the methods described herein. In some examples, aspects of the operations of 1920 may be performed by a relayed data receiving component as described with reference to FIGS. 9 through 12.

Figure 20:
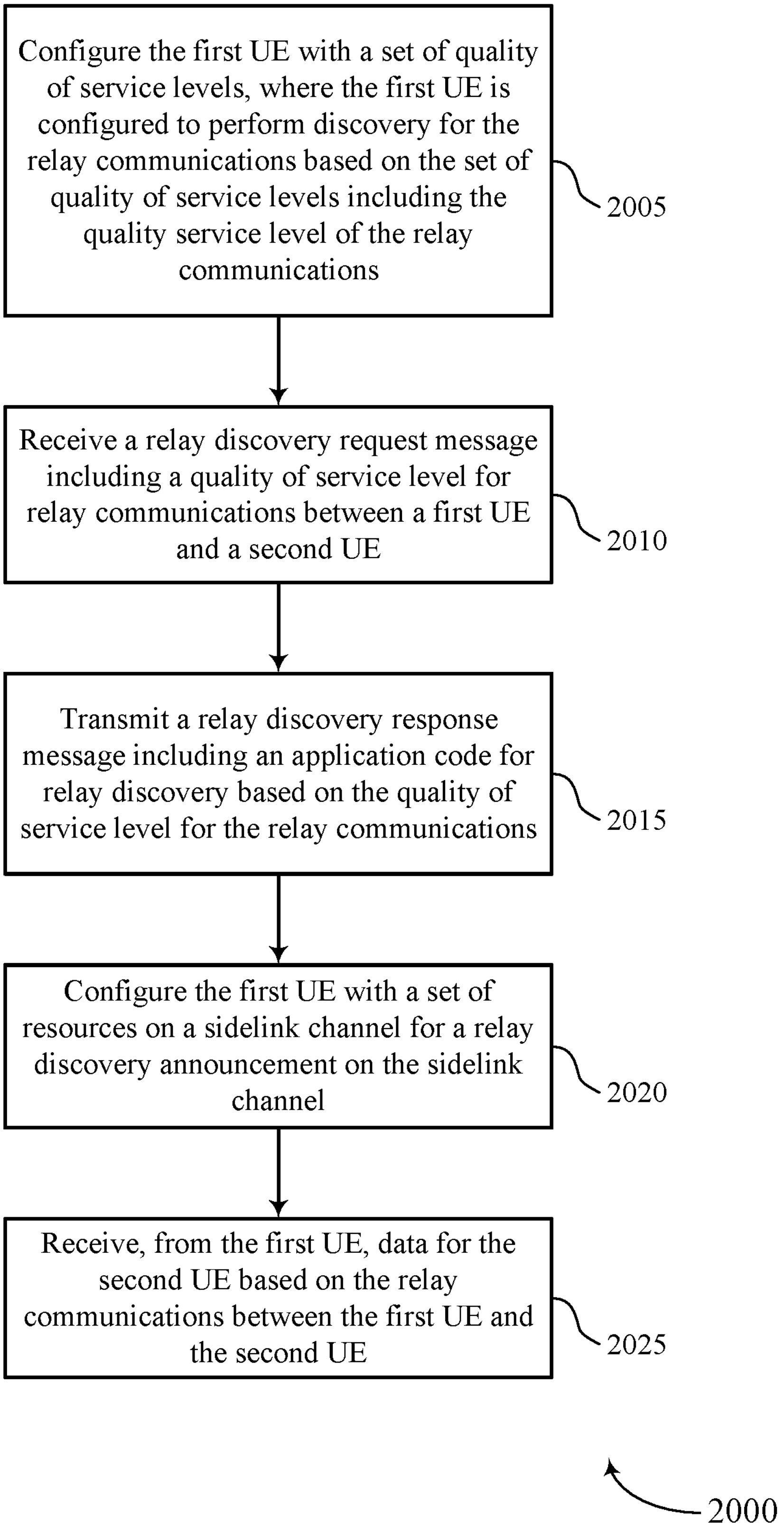

FIG. 20 shows a flowchart illustrating a method 2000 that supports techniques for selecting and reselecting sidelink relay in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 2005, the base station may configure the first UE with a set of quality of service levels, where the first UE is configured to perform discovery for the relay communications based on the set of quality of service levels including the quality service level of the relay communications. The operations of 2005 may be performed according to the methods described herein. In some examples, aspects of the operations of 2005 may be performed by a relay operation condition configuring component as described with reference to FIGS. 9 through 12.

At 2010, the base station may receive a relay discovery request message including a quality of service level for relay communications between a first UE and a second UE. The operations of 2010 may be performed according to the methods described herein. In some examples, aspects of the operations of 2010 may be performed by a discovery request message component as described with reference to FIGS. 9 through 12.

At 2015, the base station may transmit a relay discovery response message including an application code for relay discovery based on the quality of service level for the relay communications. The operations of 2015 may be performed according to the methods described herein. In some examples, aspects of the operations of 2015 may be performed by a discovery response message component as described with reference to FIGS. 9 through 12.

At 2020, the base station may configure the first UE with a set of resources on a sidelink channel for a relay discovery announcement on the sidelink channel. The operations of 2020 may be performed according to the methods described herein. In some examples, aspects of the operations of 2020 may be performed by a relay resources configuring component as described with reference to FIGS. 9 through 12.

At 2025, the base station may receive, from the first UE, data for the second UE based on the relay communications between the first UE and the second UE. The operations of 2025 may be performed according to the methods described herein. In some examples, aspects of the operations of 2025 may be performed by a relayed data receiving component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

receiving, from a base station, a relay configuration including a Quality of Service (QoS) level of relay communications;

determining to operate as a relay UE based at least in part on a reference signal received power measurement satisfying a high threshold and a low threshold of a set of thresholds configured for the first UE;

receiving a radio resource control message from the base station indicating a plurality of sets of thresholds comprising the set of thresholds, wherein the plurality of sets of thresholds comprises a first set of thresholds used when the first UE is not connected to a remote UE and a second set of thresholds used when the first UE is connected to at least one remote UE;

transmitting a relay discovery announcement on a sidelink channel indicating support for relay communications based at least in part on the determination to operate as the relay UE and the QoS level of the relay communications included in the relay configuration; and establishing the relay communications with a second UE based at least in part on the transmission of the relay discovery announcement on the sidelink channel.

2. The method of claim 1, further comprising:

receiving, from the second UE on the sidelink channel, a relay request to operate as the relay UE for the second UE, wherein the determination to operate as the relay UE is based at least in part on receiving the relay request.

3. The method of claim 2, further comprising:

indicating, to the second UE, load information for the first UE, battery information for the first UE, the QoS level for the relay communications, or a combination thereof, wherein the relay request is received based at least in part on the indication.

4. The method of claim 1, wherein a difference between the high threshold and the low threshold of the first set of thresholds is smaller than the difference between the high threshold and the low threshold of the second set of thresholds.

5. The method of claim 1, wherein the determination to operate as the relay UE is further based at least in part on a mobility state of the first UE.

6. The method of claim 1, further comprising:

reporting, to the base station, a reference signal measurement, load information for the first UE, battery information for the first UE, or any combination thereof; and receiving, from the base station, an indication to transmit the relay discovery announcement based at least in part on the reporting.

7. The method of claim 6, wherein the load information comprises a channel busy rate for the sidelink channel for the first UE.

8. The method of claim 6, wherein the reference signal measurement, the load information, the battery information, or any combination thereof, is transmitted in a measurement report for radio resource management.

9. The method of claim 1, further comprising:

indicating, to the second UE, the QoS level for the relay communications based at least in part on the transmission of the relay discovery announcement, wherein the QoS level is indicated by a medium access control element or by an application code associated with a discovery announcement message.

10. An apparatus for wireless communications at a first user equipment (UE), comprising:

one or more processors, one or more memories coupled with the one or more processors; and instructions stored in the one or more memories and executable by the one or more processors to cause the apparatus to:

receive, from a base station, a relay configuration including a Quality of Service (QoS) level of relay communications;

determine to operate as a relay UE based at least in part on a reference signal received power measurement satisfying a high threshold and a low threshold of a set of thresholds configured for the first UE;

receive a radio resource control message from the base station indicating a plurality of sets of thresholds comprising the set of thresholds, wherein the plurality of sets of thresholds comprises a first set of thresholds used when the first UE is not connected to a remote UE and a second set of thresholds used when the first UE is connected to at least one remote UE;

transmit a relay discovery announcement on a sidelink channel indicating support for relay communications based at least in part on the determination to operate as the relay UE and the QoS level of the relay communications included in the relay configuration; and establish the relay communications with a second UE based at least in part on the transmission of the relay discovery announcement on the sidelink channel.

11. The apparatus of claim 10, wherein the instructions are further executable by the one or more processors to cause the apparatus to:

receive, from the second UE on the sidelink channel, a relay request to operate as the relay UE for the second UE, wherein the determination to operate as the relay UE is based at least in part on receiving the relay request.

12. The apparatus of claim 11, wherein the instructions are further executable by the one or more processors to cause the apparatus to:

indicate, to the second UE, load information for the apparatus, battery information for the apparatus, the QoS level for the relay communications, or a combination thereof, wherein the relay request is received based at least in part on the indication.

13. The apparatus of claim 10, wherein a difference between the high threshold and the low threshold of the first set of thresholds is smaller than the difference between the high threshold and the low threshold of the second set of thresholds.

14. The apparatus of claim 10, wherein the determination to operate as the relay UE is further based at least in part on a mobility state of the first UE.

15. The apparatus of claim 10, wherein the instructions are further executable by the one or more processors to cause the apparatus to:

report, to the base station, a reference signal measurement, load information for the first UE, battery information for the first UE, or any combination thereof; and receive, from the base station, an indication to transmit the relay discovery announcement based at least in part on the reporting.

16. The apparatus of claim 15, wherein the load information comprises a channel busy rate for the sidelink channel for the first UE.

17. The apparatus of claim 15, wherein the reference signal measurement, the load information, the battery information, or any combination thereof, is transmitted in a measurement report for radio resource management.

18. The apparatus of claim 10, wherein the instructions are further executable by the one or more processors to cause the apparatus to:

indicate, to the second UE, the QoS level for the relay communications based at least in part on the transmission of the relay discovery announcement, wherein the QoS level is indicated by a medium access control element or by an application code associated with a discovery announcement message.

19. The apparatus of claim 10, wherein the instructions are further executable by the one or more processors to cause the apparatus to:

receive, from the base station, a set of QoS levels comprising at least the QoS level for the relay communications, wherein the relay discovery announcement is transmitted on the sidelink channel based at least in part on the set of QoS levels comprising the QoS level of the relay communications.

20. The apparatus of claim 10, wherein the instructions are further executable by the one or more processors to cause the apparatus to:

receive, from the base station, a radio resource control configuration for a set of resources to transmit the relay discovery announcement on the sidelink channel.

21. The apparatus of claim 10, wherein the instructions are further executable by the one or more processors to cause the apparatus to:

receive, from a base station, downlink control information scheduling the first UE a set of resources to transmit the relay discovery announcement on the sidelink channel.

22. The apparatus of claim 10, wherein the instructions are further executable by the one or more processors to cause the apparatus to:

transmit, to a base station, a relay discovery announcement request comprising the QoS level supported by the first UE for relay communications; and receive, from the base station, a relay discovery announcement response for the relay discovery announcement request, wherein the transmission of the relay discovery announcement is based at least in part on receiving the relay discovery announcement response.

23. The apparatus of claim 10, wherein the instructions are further executable by the one or more processors to cause the apparatus to:

include an indicator in a packet data convergence protocol (PDCP) packet of the relay discovery announcement that the relay discovery announcement is associated with relay discovery.

24. The apparatus of claim 10, wherein the instructions are further executable by the one or more processors to cause the apparatus to:

receive, from the second UE on the sidelink channel, a measurement report of the sidelink channel based at least in part on an L3 filtering of a reference signal measurement.

25. An apparatus for wireless communications at a first user equipment (UE), comprising:

means for receiving, from a base station, a relay configuration including a Quality of Service (QoS) level of relay communications;

means for determining to operate as a relay UE based at least in part on a reference signal received power measurement satisfying a high threshold and a low threshold of a set of thresholds configured for the first UE;

means for receiving a radio resource control message from the base station indicating a plurality of sets of thresholds comprising the set of thresholds, wherein the plurality of sets of thresholds comprises a first set of thresholds used when the first UE is not connected to a remote UE and a second set of thresholds used when the first UE is connected to at least one remote UE;

means for transmitting a relay discovery announcement on a sidelink channel indicating support for relay communications based at least in part on the determination to operate as the relay UE and the QoS level of the relay communications included in the relay configuration; and means for establishing the relay communications with a second UE based at least in part on the transmission of the relay discovery announcement on the sidelink channel.

26. A non-transitory computer-readable medium storing code for wireless communications at a first user equipment (UE), the code comprising instructions executable by one or more processors to:

receive, from a base station, a relay configuration including a Quality of Service (QoS) level of relay communications;

determine to operate as a relay UE based at least in part on a reference signal received power measurement satisfying a high threshold and a low threshold of a set of thresholds configured for the first UE;

receive a radio resource control message from the base station indicating a plurality of sets of thresholds comprising the set of thresholds, wherein the plurality of sets of thresholds comprises a first set of thresholds used when the first UE is not connected to a remote UE and a second set of thresholds used when the first UE is connected to at least one remote UE;

transmit a relay discovery announcement on a sidelink channel indicating support for relay communications based at least in part on the determination to operate as the relay UE and the QoS level of the relay communications included in the relay configuration; and establish the relay communications with a second UE based at least in part on the transmission of the relay discovery announcement on the sidelink channel.

* * * * *